US008062408B2

(12) United States Patent
Chen et al.

(10) Patent No.: US 8,062,408 B2
(45) Date of Patent: Nov. 22, 2011

(54) INTEGRATED VACUUM ABSORPTION STEAM CYCLE GAS SEPARATION

(75) Inventors: Shiaguo Chen, Champaign, IL (US); Yonggi Lu, Urbana, IL (US); Massoud Rostam-Abadi, Champaign, IL (US)

(73) Assignee: The Board of Trustees of the University of Illinois, Urbana, IL (US)

( * ) Notice: Subject to any disclaimer, the term of this patent is extended or adjusted under 35 U.S.C. 154(b) by 1059 days.

(21) Appl. No.: 11/801,197

(22) Filed: May 8, 2007

(65) Prior Publication Data
US 2007/0256559 A1 Nov. 8, 2007

Related U.S. Application Data

(60) Provisional application No. 60/798,489, filed on May 8, 2006.

(51) Int. Cl.
B01D 53/14 (2006.01)
(52) U.S. Cl. .................. 95/163; 95/168; 95/191; 95/207
(58) Field of Classification Search .................... 95/169, 95/158–159, 179; 60/39.01
See application file for complete search history.

(56) References Cited

U.S. PATENT DOCUMENTS

| | | | |
|---|---|---|---|
| 2,242,323 A | 5/1941 | Powell | |
| 2,358,600 A | 9/1944 | Selten | |
| 2,379,076 A | 6/1945 | Gollmar | |
| 2,464,805 A | 3/1949 | Gollmar | |
| 3,241,741 A * | 3/1966 | Augusto | 417/71 |
| 3,823,222 A * | 7/1974 | Benson | 423/223 |
| 3,847,570 A | 11/1974 | Gunther | |
| 3,878,352 A * | 4/1975 | Inoue | 219/69.14 |
| 3,898,058 A * | 8/1975 | McGill | 95/246 |
| 4,039,306 A * | 8/1977 | Taylor | 96/114 |
| 4,217,237 A * | 8/1980 | Sartori et al. | 252/192 |
| 4,491,566 A * | 1/1985 | Adams et al. | 423/220 |

(Continued)

OTHER PUBLICATIONS

D. Singh, E. Croiset, P.L. Douglas, and M.A. Douglas, Techno-Economic Study of $CO_2$ Capture From an Existing Coal-Fired Power Plant: MEA Scrubbing vs. $O_2/CO_2$ Recycle Combustion, Energy Conversion and Management 44, 2003, pp. 3073 -3091.

(Continued)

Primary Examiner — Duane Smith
Assistant Examiner — Ives Wu
(74) Attorney, Agent, or Firm — Greer, Burns & Crain Ltd.

(57) ABSTRACT

Methods and systems for separating a targeted gas from a gas stream emitted from a power plant. The gas stream is brought into contact with an absorption solution to preferentially absorb the targeted gas to be separated from the gas stream so that an absorbed gas is present within the absorption solution. This provides a gas-rich solution, which is introduced into a stripper. Low pressure exhaust steam from a low pressure steam turbine of the power plant is injected into the stripper with the gas-rich solution. The absorbed gas from the gas-rich solution is stripped in the stripper using the injected low pressure steam to provide a gas stream containing the targeted gas. The stripper is at or near vacuum. Water vapor in a gas stream from the stripper is condensed in a condenser operating at a pressure lower than the stripper to concentrate the targeted gas. Condensed water is separated from the concentrated targeted gas.

5 Claims, 12 Drawing Sheets

U.S. PATENT DOCUMENTS

| | | | | |
|---|---|---|---|---|
| 4,528,811 | A * | 7/1985 | Stahl | 60/784 |
| 4,542,010 | A * | 9/1985 | Roman et al. | 423/579 |
| 4,719,016 | A * | 1/1988 | Storkebaum et al. | 210/640 |
| 5,017,350 | A * | 5/1991 | Hakka et al. | 423/242.7 |
| 5,051,188 | A * | 9/1991 | Spiske et al. | 210/640 |
| 5,146,009 | A * | 9/1992 | Cohen et al. | 568/889 |
| 5,281,254 | A * | 1/1994 | Birbara et al. | 95/44 |
| 5,683,587 | A | 11/1997 | Ferrara et al. | |
| 6,117,328 | A * | 9/2000 | Sikdar et al. | 210/640 |
| 6,228,145 | B1 * | 5/2001 | Falk-Pedersen et al. | 95/44 |
| 6,298,664 | B1 | 10/2001 | Asen | |
| 6,497,852 | B2 | 12/2002 | Chakravarti et al. | |
| 7,637,987 | B2 * | 12/2009 | Mak | 95/160 |
| 7,837,877 | B2 * | 11/2010 | Cao et al. | 210/640 |

OTHER PUBLICATIONS

A.B. Rao and E.S. Rubin, Identifying Cost-Effective $CO_2$ Control Levels From Amine-Based $CO_2$ Capture Systems, Ind. Eng. Chem. Res. 2006, 45, pp. 2421-2429.

R. J. Finley, MGCS Project Team, An Assessment of Geological Carbon Sequestration Options in the Illinois Basin, A DOE Regional Sequestration Partnership, Midwest Geological Sequestration Consortium, Alexandria, VA, May 2006.

S. E. Greenberg, Geologic Sequestration: An Opportunity for Educational Outreach, Fifth Annual Conference on Carbon Capture & Sequestration in Alexandria, VA, May 2006.

C. Korose, GIS-Based Volumetric Calculations: $CO_2$ Sequestration and Enhanced Coalbed Methane Potential, Fifth Annual Conference on Carbon Capture & Sequestration in Alexandria, VA, May 2006.

J. McBride, H. E. Leetaru, A Strategy for Assessing Deep Faulting and Possible Structural Reactivation in Target Sequestration Reservoirs, Fifth Annual Conference on Carbon Capture & Sequestration in Alexandria, VA, May 2006.

K. H. Leetaru and H. E. Leetaru, The Use of Data Mining Methods to Evaluate Public Interest in Carbon Sequestration, Fifth Annual Conference on Carbon Capture & Sequestration in Alexandria, VA, May 2006.

A. Drobniak, C. Korose, M. Mastalerz, A. Anderson, T. R. Moore, and J. Rupp, Sequestration Potential in the Illinois Basin Coal Beds, Sep. 2005.

Geological Sequestration of Carbon Dioxide in the Illinois Basin, poster, May 2005.

R. A. Knepp, D. A. Garner, S. M. Frailey, B. Seyler, C. P. Korose, J. P. Grube, D. A. Keefer, and S. Rittenhouse, $CO_2$ Sequestration and Enhanced Oil Recovery Potential in Illinois Basin Oil Reservoirs, May 2005.

A. C. Anderson, T. R. Moore, S. M. Frailey, J. A. Rupp, and C. F. Eble, Geological Sequestration of Carbon Dioxide in the Illinois Basin, Assessing Geological Sequestration Options in the Illinois Basin, Midwest Geological Sequestration Consortium, May 2005.

A. Drobniak, C. P. Korose, M. Mastalerz, T. R. Moore, and J. A. Rupp, Sequestration Potential in the Illinois Basin Coal Beds; Facts and Uncertainties, May 2005.

W. Solano-Acosta, J. A. Rupp, M. Mastalerz, and A. Schimmelmann, Enhanced Coalbed Methane Recovery and $CO_2$ Sequestration Options in Indiana Coals, Apr. 2005.

A. Drobniak, M. Mastalerz, C. F. Eble, C. P. Korose, and S. D. Elrick, Illinois Basin Coal GIS Datasets for Coalbed Methane, Carbon Sequestration, and Coal Resource Studies, Geological Surveys of Indiana, Kentucky, and Illinois, Nov. 2004.

B. C. Nuttall, J. A. Drahovzal, C. F. Eble, and R. M. Bustin, Analyses of Devonian Black Shale in Kentucky for Potential Carbon Dioxide Sequestration and Enhanced Natural Gas Production-GHGT-7 in Vancouver, Canada, Sep. 2004.

S. M. Frailey, H. E. Leetaru, R. J. Finley, S. R. Gustison, C, P. Korose, D. A. Garner, J. Rupp, and J. Drahovzal, Illinois Basin Screening Criteria for Geologic $CO_2$ Sequestration, Sep. 2004.

C. P. Korose, D. A. Garner, A. Luther, S. M. Frailey, and B. Seyler, Oil Field Screening Study for $CO_2$ Sequestration and Enhanced Oil Recovery in the Illinois Basin, Sep. 2004.

S. E. Greenberg, Midwest Geological Sequestration Consortium: An Overview, U.S. EPA—Region 5 Midwest Regional Sequestration Conference in Angola, IN, Mar. 2007.

S. E. Greenberg, Midwest Geological Sequestration Consortium Outreach Working Group: Pilot Study Update, U.S. EPA—Region 5 Midwest Regional Sequestration Conference in Angola, IN, Mar. 2007.

R. J. Finley, Fossil Fuels, Carbon Emissions and Coal Gasification: A Different Future?, Alpha Chi Sigma University of Illinois 2007 Annual Krug Lecture in Champaign, IL, Mar. 2007.

R. J. Finley, Energy, Carbon, and Illinois Basin Oil, Illinois Oil and Gas Association Meeting in Evansville, IN, Mar. 2007.

R. J. Finley, Carbon Sequestration, FutureGen, and Coal Gasification Development in the Illinois Basin, Fourth Annual $CO_2$ Sequestration and Carbon Management Workshop, Houston, TX, Dec. 2006.

S. E. Greenberg, Bridging the Gap: Climate Change, Energy Needs and the Future, Earth Science Week Presentation at Eastern Illinois University in Charleston, IL, Oct. 2006.

S. E. Greenberg, Bridging the Gap: Climate Change, Energy Needs and the Future, Heidelberg College Seminar Series in Tiffin, OH, Nov. 2006.

R. Knepp, S. M. Frailey, B. Seyler, S. R. Gustison, J. P. Grube, and B. G. Huff, Testing the Efficacy of $CO_2$ for Enhanced Oil Recovery in the Illinois Basin, 2006 American Association of Petroleum Geologist Eastern Section Meeting in Buffalo, NY, Oct. 2006.

R. J. Finley, An Assessment of Geological Carbon Sequestration Options in the Illinois Basin (Phase I), Final Technical Report, Feb. 2004-Sep. 2005.

R. J. Finley, An Assessment of Geological Carbon Sequestration Options in the Illinois Basin, Phase II Year One Update, 2006 Regional Carbon Sequestration Partnerships Annual Review Meeting in Pittsburgh, PA, Oct. 2006.

S. R. Gustison, $CO_2$ Single Well Injection/Soak/Produce or Huff 'n. Puff, 2006 Regional Carbon Sequestration Partnerships Annual Review Meeting in Pittsburgh, PA, Oct. 2006.

D. G. Morse, A. Anderson, $CO_2$ Injection Into Illinois Coals, 2006 Regional Carbon Sequestration Partnerships Annual Review Meeting in Pittsburgh, PA, Oct. 2006.

H. E. Leetaru, Saline Reservoirs, 2006 Regional Carbon Sequestration Partnerships Annual Review Meeting in Pittsburgh, PA, Oct. 2006.

H. E. Leetaru, J. McBride, J. Belluchi, J. Freiburg, Importance of Seismic Reflection Data in Planning a Carbon Sequestration Project in Deep Saline Reservoirs, Fifth Annual Conference on Carbon Capture & Sequestration in Alexandria, VA, May 2006.

S. Chen, Y. Lu, M. Rostam-Abadi, J. D. Figueroa, Optimization of the Integrated Geological Sequestration of Carbon Dioxide in Illinois Basin, Fifth Annual Conference on Carbon Capture & Sequestration in Alexandria, VA, May 2006.

S. Chen, Y. Lu, M. Rostam-Abadi, Critical Review of $CO_2$ Separation Technologies for Post-Combustion Flue Gases, Fifth Annual Conference on Carbon Capture & Sequestration in Alexandria, VA, May 2006.

Y. Lu, S. Chen, M. Rostam-Abadi, J. D. Figueroa, Case Studies of $CO_2$ Capture Retrofitting in Existing Coal-Fired Power Plants, Fifth Annual Conference on Carbon Capture & Sequestration in Alexandria, VA, May 2006.

R. McKaskle, K. Fisher, S. M. Frailey, Design of a $CO_2$ Injection System for Sequestration and Enhanced Oil and Gas Recovery Testing, Fifth Annual Conference on Carbon Capture & Sequestration in Alexandria, VA, May 2006.

S. Harpalani, A. Kumar, How Real and Significant is Sorption-Induced Matrix Swelling/Shrinkage in Coalbed Methane and $CO_2$ Injection Operations, Fifth Annual Conference on Carbon Capture & Sequestration in Alexandria, VA, May 2006.

S. E. Greenberg, Geologic Sequestration and Climate Change: Developing an Integrated Approach for Professional Development Workshops, 40th Annual Meeting of the North-Central Section of the Geological Society of America in Akron, OH, Apr. 2006.

R. J. Finley, World Energy Impacts on Illinois: More Folks at the Table Than Ever Before, ISGS Centennial Lecture in Champaign, IL, Apr. 2006.

R. J. Finley, S. M. Frailey, Site. Screening and Assessment for Testing Geological Sequestration in the Illinois Basin Presentation and Proceeding, International Symposium on Site Characterization for $CO_2$ Geological Storage in Berkeley, CA, Mar. 2006.

I. G. Krapac, The MMV Plan for $CO_2$ Sequestration in the Illinois Basin, ISGS Seminar in Champaign, IL, Feb. 2006.

R. J. Finley, MGSC Phase I Project Outcomes, 2005 Regional Carbon Sequestration Partnerships Annual Review Meeting in Pittsburgh, PA, Oct. 2005.

R. J. Finley, Introduction to Phase II Plans, MGSC Project Team, 2005 Regional Carbon Sequestration Partnerships Annual Review Meeting in Pittsburgh, PA, Oct. 2005.

I. G. Krapac, Overview Monitoring, Mitigation, and Verification (MMV) Program, Phase II, 2005 Regional Carbon Sequestration Partnerships Annual Review Meeting in Pittsburgh, PA, Oct. 2005.

M. Rostam-Abadi, S. Chen, and Y. Lu, Assessment of Carbon Capture Options for Power Plants, Fourth Annual Conference on Carbon Capture & Sequestration in Alexandria, Virginia, May 2005.

R. J. Finley, An Assessment of Geological Carbon Sequestration Options in the Illinois Basin, Phase I, 2003 Regional Carbon Sequestration Partnerships Annual Review Meeting in Pittsburgh, PA, Nov. 2003.

Illinois State Geological Survey, Evaluation of $CO_2$ Capture Options from Ethanol Plants, Topical Report, Oct. 2006.

Carbon Sequestration Technology Roadmap and Program Plan 2007, U.S. Dept. of Energy, NETL, Jun. 2007.

Storing $CO_2$ Underground, World Coal Institute/IEA Greenhouse Gas R&D Programme, May 2007, UK.

Capturing $CO_2$, IEA Greenhouse Gas R&D Programme, May 2007.

Carbon Sequestration Atlas of the United States and Canada, US Department of Energy, Netl, Dec. 2006.

J. R. Pidot, Global Warming in the Courts: An Overview of Current Litigation and Common Legal Issues, Georgetown Environmental Law and Policy Institute, Washington, DC, Copyright 2006.

$CO_2$ EOR Technology, Technologies for tomorrow's E&P Paradigms, NETL Brochure, Mar. 2006.

Carbon Sequestration Project Portfolio, U.S. Department of Energy, NETL, 2007.

Canada's $CO_2$ Capture and Storage Technology Roadmap, CCSTRM, Clean Energy Technologies, Mar. 2006.

J. J. Dopley et al., Carbon Dioxide Capture and Geologic Storage, A Core element of a Global Energy Technology Strategy to Address Climate Change, GTSP, Apr. 2006.

Demonstrating Carbon Sequestration, GeoTimes, Mar. 2003.

Putting Carbon back Into the Ground, IEA Greenhouse Gas R & D Programme, Feb. 2001.

Natural Releases of $CO_2$, IEA Greenhouse Gas R&D Programme.

D. Nyman, J.S. Dracos, Assess Carbon Dioxide Transportation Options in the Illinois Basin, Topical Report, Midwest Geological Sequestration Consortium, Dec. 31, 2005.

M. Rostam-Abadi, S.S. Chen, Y. Lu, Asses Carbon Dioxide Capture Options for Illinois Basin Carbon Dioxide Sources, Topical Report, Midwest Geological Sequestration Consortium, Dec. 31, 2005.

Determination of Coal Characteristics Affecting $CO_2$ Absorption Capacity, Comet Modeling and GIS-Based Volumetric Calculations, "Best Case" Results for Enhanced $CH_4$ Storage Potentials in Illinois Basin Coals, poster, DOE-NETL.

Midwest Geological Sequestration Consortium, Phase I, An Assessment of Geological Carbon Sequestration in the Illinois Basin.

Midwest Geological Sequestration Consortium, Phase II, Planned Enhanced Oil Recovery Pilots and Enhanced Coal Bed, Methane Pilot in the Illinois Basin.

B. A. Oyenekan and G. T. Rochelle, Energy Performance of Stripper Configurations for $CO_2$ Capture by Aqueous Amines, Ind. Eng. Chem. Res. 45 (2006) pp. 2457-2464.

C. Alie, L. Backham, E. Croiset, P. L. Douglas, Simulation of $CO_2$ Capture Using MEA Scrubbing: A Flowsheet Decomposition Method, Energy Conversion and Management 46 (2005) pp. 475-487.

S. Reddy, J. Scherffius, S. Freguia, C. Roberts, Fluor's Econamine FG Plus$^{SM}$ Technology: An Enhanced Amine-Based $CO_2$ Capture Process, FLUOR®, Second National Conference on Carbon Sequestration National Energy Technology/Department of Energy, Alexandria, VA, May 2003.

A. B. Rao and E. S. Rubin, A Technical, Economic, and Environmental Assessment of Amine-Based $CO_2$ Capture Technology for Power Plant Greenhouse Gas Control, Environ. Sci. Technol., 36 (2002) pp. 4467-4475.

T. Mimura, S. Shimojo, T. Suda, M. Iijima and S. Mitsuoka, Research and Development on Energy Saving Technology for Flue Gas Carbon Dioxide Recovery and Steam System in Power Plant, Energy Conyers. Mgmt., vol. 36, No. 6-9 (1995) pp. 397-400.

Y. Yagi, T. Mimura, M. Iijima, K. Ishida, R. Yoshiyama, T. Kamijo, and T. Yonekawa, Improvements of Carbon Dioxide Capture Technology from Flue Gas, 7$^{th}$ International Conference on Greenhouse Gas Control Technologies, Vancouver, CA, Sep. 2004.

J. T. Cullinane and G. T. Rochelle, Thermodynamics of Aqueous Potassium Carbonate, Piperazine, and Carbon Dioxide, Fluid Phase Equilibria 227 (2005) pp. 197-213.

J. T. Cullinane and G. T. Rochelle, Kinetics of Carbon Dioxide Absorption into Aqueous Potassium Carbonate and Piperazine, Ind. Eng. Chem. Res. 45 (2006) pp. 2531-2545.

S. Bishnoi and G. T. Rochelle, Absorption of Carbon Dioxide into Aqueous Piperazine: Reaction Kenetics, Mass Transfer and Solubility, Chem. Eng. Science 55 (2000) pp. 5531-5543.

J. T. Cullinane and G. T. Rochelle, Carbon Dioxide Absorption with Aqueous Potassium Carbonate Promoted by Piperazine, Chem. Eng. Science 59 (2004) pp. 3619-3630.

R. Finley, An Assessment of Geological Carbon Sequestration Options in the Illinois Basin, Final Report, Midwest Geological Sequestration Consortium, Dec. 31, 2005.

* cited by examiner

| PC power plant | |  |
|---|---|---|
| Gross output, MWe | 528 | |
| Unit type | Sub-critical PC | |
| Coal | IL bituminous | |
| Excess Air, % | 15% | |
| Gas temp. exiting air preheater, °F | 295 | |
| Main steam condition | 2,415 psia/1000 °F | |
| Reheat steam condition | 545 psia/1000 °F | |
| Turbine efficiency, % | 88.5% | |
| $SO_2$ removal, % | 98% (Limestone Forced Oxidation) | |
| Particle removal, % | 99% (ESP) | |
| $CO_2$ capture and compression | | |
|  | MEA process | $K_2CO_3$ process |
| Solvent concentration, %wt | 30% MEA | 20% $K_2CO_3$ |
| Pressure drop in absorber, psia | 2 | 2 |
| Temp. of flue gas entering absorber, °F | 129 | 129 |
| Temp. of solvent entering absorber, °F | 104 | 122 |
| Liquid to gas ratio, lb/lb | 3.86 | 1, 1.2, 1.5 $(L/G)_{min}$ |
| Lean $CO_2$ loading, %wt | 5.5% | 0.5%, 1%, 1.5% |
| Pressure at the top of stripper, psia | 25 | 2, 4, 6, 8 |
| Pressure drop in stripper, psia | 2 | 1 |
| Vacuum pump efficiency, % | - | 85% |
| $CO_2$ removal, % | 90% | 90% |
| Compressor efficiency, % | 82% (4-stage, inter-stage cooling) | |
| Inter-stage cooling temperature, °F | 104 | |
| Compression end pressure, psia | 1,200 | |

FIG. 4

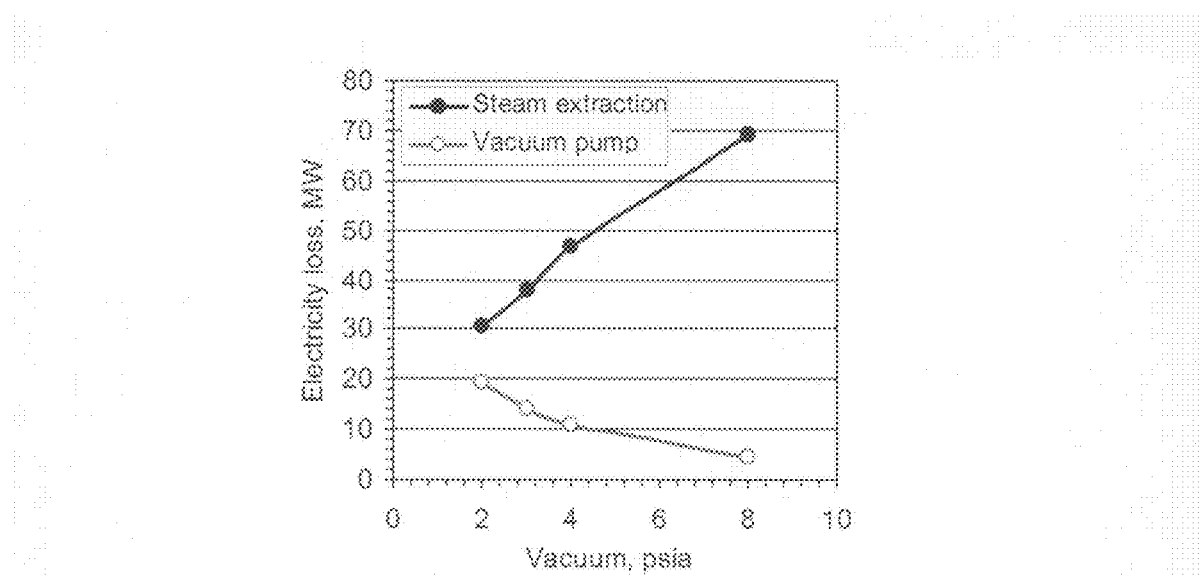
FIG. 12
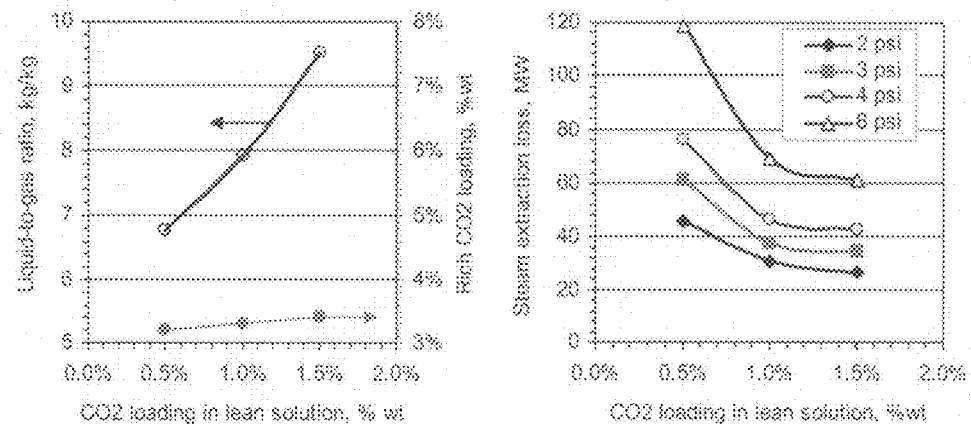
FIG. 14
FIG. 15

| Electricity, MWe | PC | PC+ Vacuum | PC+ MEA |
|---|---|---|---|
| $CO_2$ capture process: | | | |
| Steam extraction loss | 0 | 37.81 | 89.43 |
| Gas blower | 0 | 10.03 | 10.03 |
| Liquid pump | 0 | 2.81 | 1.79 |
| Vacuum pump | 0 | 13.96 | 0 |
| $CO_2$ compression | 0 | 39.65 | 35.42 |
| Aux. energy use in power plant | 34.74 | 33.27 | 32.00 |
| Net electricity output | 492.86 | 390.07 | 358.93 |

FIG. 13

| | MEA process | | Vacuum process | |
|---|---|---|---|---|
| Annualized cost of $CO_2$ capture | Cost, M$/y | Share, % | Cost, M$/y | Share, % |
| Capital cost | 24.30 | 30.98% | 36.45 | 51.38% |
| Fixed O&M | 4.97 | 6.34% | 7.46 | 10.52% |
| Variable O&M-energy | 32.56 | 41.51% | 24.99 | 35.23% |
| Variable O&M -sorbent | 11.26 | 14.35% | 1.70 | 2.39% |
| Variable O&M -others | 5.35 | 6.82% | 0.34 | 0.48% |
| Subtotal | 78.44 | 100.00% | 70.94 | 100.00% |
| Net electricity, MW | 358.93 | | 390.07 | |
| Loading factor, % | 75% | | 75% | |
| Annualized cost, c/kWh | 3.33 | | 2.77 | |
| Reference $CO_2$ emissions, lb/kWh | 1.88 | | 1.88 | |
| $CO_2$ emissions with control, lb/kWh | 0.26 | | 0.24 | |
| $CO_2$ avoidance cost, $/ton | 41.00 | | 33.69 | |

FIG. 17

INTEGRATED VACUUM ABSORPTION STEAM CYCLE GAS SEPARATION

PRIORITY CLAIM

This application claims the benefit of U.S. Provisional Application Ser. No. 60/798,489, filed May 8, 2006, under 35 U.S.C. §119.

STATEMENT OF GOVERNMENT INTEREST

This invention was made with Government assistance under Department of Energy Grant No. DE-FC26-03NT41994. The Government has certain rights in this invention.

BACKGROUND OF THE INVENTION

A field of the invention is gas treatment. A particular exemplary application of the invention is to flue gas treatment, such as from flue gases of power plants. The invention is particularly applicable to treatment of gas streams.

Conventional coal-firing plants use a steam cycle for power generation. Steam cycles are also used in newer power plants, such as Integrated Gasification Combined Cycle (IGCC) power plants or Natural Gas Combined Cycle (NGCC) power plants. In a conventional steam cycle power plant, only about one-third of the heat energy contained in the fossil fuel is converted to electricity. This leaves more than half of the energy wasted in the water cooling towers. The water cooling tower transfers all of the waste heat in the low pressure exhaust steam (1.2 psia, 107.8° F.) to the environment through the vaporization of cooling water.

On the other hand, $CO_2$ separation from post-combustion flue gas requires a large amount of heat (in the form of steam). For example, the current state-of-the-art monoethanol amine (MEA) absorption process requires about 4 MJ of total heat for every kilogram of $CO_2$ captured. The steam that carries the heat has a pressure of around 60 psia. An absorption process that uses steam at a much lower pressure will have a significant advantage over the MEA-based absorption process.

Conventional $CO_2$ separation processes are energy intensive. The required energy is provided by steam in the power plant. The extraction of steam from the steam turbine reduces the electricity generation (output). For the same amount of steam, the higher the pressure (and thus the temperature) of the extracted steam is, the higher the loss of the electricity will be. State-of-the-art amine-based absorption processes reduce electricity output by about 30%. For example, the installation of an MEA-based process in a steam cycle power plant will reduce its net electricity output from 500 MW to around 350 MW.

This energy cost, and the associated financial cost, inhibits the adoption of $CO_2$ separation. With conventional MEA-based absorption processes, the cost of $CO_2$ separation from post-combustion flue gases takes more than 80% of the total $CO_2$ sequestration cost. High separation cost is the main reason for the delaying of $CO_2$ emission control. High $CO_2$ separation cost is also hindering the acceptance of $CO_2$ based Enhanced Oil Recovery (EOR) technology.

$CO_2$ emission control from power plants is not regulated at this time in the United States. There are several thousand power plants in the United States alone. If $CO_2$ emission control becomes mandatory, an efficient and cost-effective process will be required. If voluntary reductions of emissions are to be encouraged, the cost of emission control must also be reduced. Currently, the $CO_2$ emission level in the United States is about 20% above the level of 1990. A goal defined by the Kyoto protocol is that the United States needs to control around 20% of $CO_2$ emission, which is about 12 Billion metric tons annually, equivalent to 300 of 500 MW power plants. Acceptance and adoption of $CO_2$ separation, whether voluntary or by treaty or regulation, requires an improved $CO_2$ separation process.

SUMMARY OF THE INVENTION

According to exemplary embodiments of the present invention, methods and systems are provided for separating a targeted gas from a gas stream emitted from a power plant. In a preferred method, the gas stream is brought into contact with an absorption solution to preferentially absorb the targeted gas to be separated from the gas stream so that an absorbed gas is present within the absorption solution. This provides a gas-rich solution, which is introduced into a stripper.

Low pressure exhaust steam from a low pressure steam turbine of the power plant is injected into the stripper with the gas-rich solution. The absorbed gas from the gas-rich solution is stripped in the stripper using the injected low pressure steam to provide a gas stream containing the targeted gas. The stripper is at or near vacuum. Water vapor in a gas stream from the stripper is condensed in a condenser operating at a pressure lower than the stripper to concentrate the targeted gas. Condensed water is separated from the concentrated targeted gas.

BRIEF DESCRIPTION OF THE DRAWINGS

FIG. 4 is a table showing main operating conditions used in a simulated $CO_2$ removal system and process, according to an embodiment of the present invention;

FIG. 12 shows electricity loss at different stripping pressures;

FIG. 13 is a table showing electricity use and output in a PC power plant, PC+MEA plant, and a PC+vacuum carbonate system according to an embodiment of the present invention;

FIG. 14 shows the effect on liquid-to-gas ratio (L/G ratio) at different $CO_2$ loadings;

FIG. 15 shows the effect on steam extraction loss at different $CO_2$ loadings;

FIG. 17 shows cost comparisons for a simulated vacuum-carbonate process according to an embodiment of the present invention, and for an MEA process.

DETAILED DESCRIPTION

Figure 1:
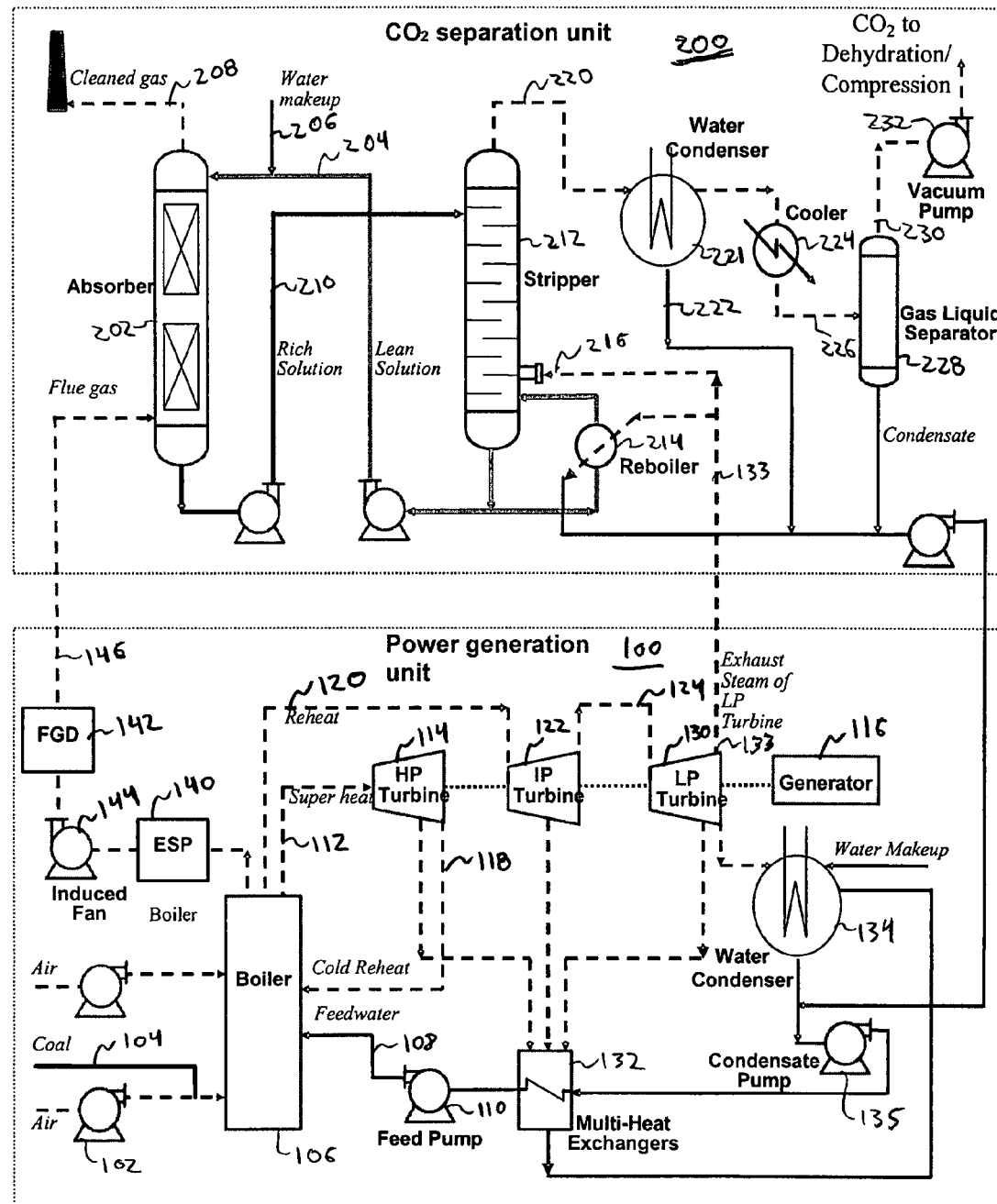
FIG. 1 is a schematic diagram of an embodiment of the invention, showing an exemplary power plant and an integrated absorption-based $CO_2$ separation process.

An integrated $CO_2$ sequestration scheme includes three general steps: $CO_2$ capture, transportation, and permanent storage. A vast majority of the fossil fuel-fired power plants, which are the most likely point sources for $CO_2$ capture, generally produce diluted $CO_2$ gas streams. Capture of $CO_2$ from these sources is the most expensive step, consuming more than 70% of the total sequestration cost. Reducing the $CO_2$ capture cost would clearly have the most significant impact on the economic performance of a sequestration process.

Currently, MEA-based absorption processes are considered the best available option for post-combustion $CO_2$ capture. However, the cost for $CO_2$ removal from the post-combustion flue gas of a pulverized coal (PC) power plant with a state-of-the-art MEA process typically ranges from $40 to $60 per ton of $CO_2$ avoided. Such a high cost may be economically unacceptable. The electricity and heat used for the MEA process has been estimated to contribute to about half of the total cost, and the O&M cost and capital cost each are estimated to contribute about a quarter. Thus, reducing the energy consumption of the $CO_2$ capture process goes a large way to lowering the total cost.

J. Ciferno, P. Dipietro, and T. Tarka, "An Economic Scoping Study for $CO_2$ Capture Using Aqueous Ammonia", US DOE/NETL Report, February 2005, showed that the large energy consumption of the MEA process reduces electricity output of a PC power plant by about 28%. Breakdowns of the electricity loss revealed that about 65% is due to the steam extracted from the power plant and used for heat in the stripper reboiler. $CO_2$ compression prior to pipeline transportation accounted for another 25% of the loss, and gas blowers and liquid pumps required in the MEA process are responsible for the remaining 10%.

Since the energy use for $CO_2$ compression is unavoidable for an absorption process, minimizing the reboiler heat duty and/or lowering the quality of the extracted steam is the most viable way to improve the process. The reboiler heat duty in an absorption process mainly depends on the reaction heat (heat of absorption) and stripping heat. The sensible heat can be mostly recovered through heat exchange in the absorption-desorption loop. For the MEA process, the reaction and stripping heats are 825 and 800 Btu/lb $CO_2$, respectively. To reduce the heat duty of the reboiler, an absorption solution with lower heat of reaction and stripping should be used.

One should note that heat energy should be described by both its quantity and quality. Heat energy at a higher temperature will contain more exergy (exergy is a measure of the work potential at a certain state, relative to the reference state, defined as $T_0=77°$ F., $P_0=14.7$ psia) compared with heat at a lower temperature. If the heat energy consumed in the $CO_2$ absorption process is of low quality (i.e., its T and P are close to $T_0$ and $P_0$), or even waste heat (whose T and P are virtually $T_0$ and $P_0$), then the total cost of the $CO_2$ capture process will be low even though the amount of heat required is large. As a typical MEA process operates at 200 to 250° F. (1-2 atm) for $CO_2$ stripping, to maintain a required temperature difference, which is the driving force for heat transfer, the steam used in the reboiler of an MEA process needs to be extracted from the power plant steam cycle at a pressure of about 60 psia (saturation temperature of 293° F.). The high temperature requirement increases the electricity loss due to steam extraction.

Embodiments of the present invention provide a uniquely integrated $CO_2$ capture/separation process for post-combustion flue gases of power plants with steam cycle. An organically integrated system according to embodiments of the invention, which integrates two processes, can save large amounts of energy and significantly reduce the $CO_2$ separation cost. In exemplary embodiments, a vacuum absorption-based separation process and the steam cycle are integrated efficiently so that the abundantly available, low quality exhaust steam in the steam cycle can be used in the $CO_2$ separation process. More particularly, in embodiments of the invention, low quality exhaust steam in the steam cycle is used for the stripping of $CO_2$ in a vacuum absorption-based $CO_2$ separation process. A lower stripping temperature can make possible the use of the heat of lower quality steam, and the temperature in the stripper can be low at a low pressure; e.g., vacuum.

Preferred systems and methods of the invention combine a vacuum absorption-based separation process with a power plant steam cycle in a way to take advantage of the low-pressure exhaust steam in the steam cycle. In preferred embodiments of the invention, the electricity output of a 500 MW power plant that adopts the $CO_2$ separation will be reduced to around 400 MW, a savings of around 50MW compared to state-of-the-art amine-based $CO_2$ separation processes. Preliminary economic analysis reveals that the $CO_2$ avoidance cost of this process will be around $33/tonne, compared with $55/tonne for an MEA process.

Preferred embodiment systems and methods of the invention, which integrate a vacuum absorption-based $CO_2$ separation process and a steam cycle in a power plant, take advantage of the low-pressure (LP) exhaust steam (1.2 to 14.7 psia) abundantly available in the steam cycle This significantly reduces electricity loss due to the installation of the exemplary $CO_2$ separation process. In embodiments of the invention, electricity loss can be substantially minimized to its theoretical limit. Additionally, compared to conventional systems, some heat exchangers can be eliminated due to the fact that absorption and desorption processes are operated at about the same temperature.

Embodiments of the invention can substantially reduce the $CO_2$ separation cost, e.g., a reduction of half of the current state-of-the-art MEA-based absorption processes and a 40% cost reduction. Such significantly reduced electricity loss can encourage the adoption of a $CO_2$ separation process.

Referring now to the drawings, FIG. 1 is a schematic diagram of an embodiment of the invention for absorption-based $CO_2$ separation processes. In the conventional $CO_2$ separation processes, the steam cycle 100 and the $CO_2$ separation process 200 are isolated. By "isolated", it is meant that there is no or little materials exchange between the two systems. The steam cycle may be, as nonlimiting examples, a pulverized coal (PC) firing power plant, an integrated gasification combined cycle power plant, or a natural gas combined cycle power plant.

Within the steam cycle (power generation unit) 100, for example, air 102 and coal 104, such as pulverized coal (PC), are used to heat a boiler 106. Within the boiler 106, feedwater 108 is fed via a feed pump 110 and heated to produce superheated steam 112. The superheated steam 112 is fed to a high-pressure (HP) turbine 114, which in turn drives a generator 116. Exhaust steam 118 from the HP turbine is reheated by the boiler 106, and the reheated steam 120 is fed to an intermediate pressure (IP) turbine 122, also driving the generator 116. Exhaust steam from the IP turbine 124 in turn is fed to a low pressure (LP) turbine 130, which, again, drives the generator 116.

Additional exhaust steam from the HP, IP, and LP turbines 114, 122, 130 is fed to multi-heat exchangers 132. Some exhaust steam from the LP turbine 130 enters a water condenser 134, and the resulting water is fed into the multi-heat exchangers 132 using a condensate pump 135. Thus, in the steam cycle, the low pressure exhaust steam 133 from the LP steam turbine 114 can go to the condenser 134 to be condensed. The condensed water is then recycled to generate steam in the boiler 106, and the cycle goes on. The operating condition in the condenser 134 is about 1.2 psia and 107.8° F. The lower the operating temperature (thus the pressure, since it is a saturated steam) is, the higher the thermal efficiency of the power generation system 100 will be. However, the lowest operating temperature is limited by the temperature of the cooling water, which depends on water sources and the season as well. In the summer, the operating temperature will be higher than in the winter.

Flue gas from the boiler 106 enters an electrostatic precipitator (ESP) 140 and then a flue gas desulfurization (FGD) 142 via an induced fan 144. Cleaned flue gas 146 containing carbon dioxide ($CO_2$) exits to the $CO_2$ separation unit 200.

Within the $CO_2$ separation unit 200, the cleaned flue gas 146 enters an absorber 202, into which is fed a lean solution 204 (along with water makeup 206) for absorbing acid gas such as $CO_2$. The absorber 202 may include, for example, any suitable absorption device, such as, but not limited to, an absorption tower, that allows the flue gas stream 146 to be brought into contact with the absorption solution 204 to preferentially absorb the targeted gas (e.g., $CO_2$) to be separated from the main gas. After absorption, the cleaned gas 208 exits, while the $CO_2$-rich solution 210 is introduced to a stripper 212 for $CO_2$ stripping. A nonlimiting example of the stripper 212 is a stripping tower.

In the conventional absorption process, the stripping steam is generated in a reboiler at the bottom of the stripper. The steam extracted from the steam turbine provides the heat to vaporize the $CO_2$-rich solution at one side of the reboiler and itself is condensed at the other side of the reboiler. Since the heat is supplied through the reboiler, a temperature difference ($\Delta T$) between the steam side and solution side is always required. This $\Delta T$ will impact the quality of the extracted steam. A $\Delta T$ of 20° C. could lead to a 3% thermal efficiency loss. Further, the (huge) reboiler requires a large capital investment.

In the $CO_2$ separation unit 200, the stripper 212 may also be heated by a stripper reboiler 214, which may be heated, for example, using part of the exhaust steam 133 from the LP turbine 130. Preferably, a heat exchanger is used to transfer heat from the LP exhaust steam 133 to the absorption solution in the reboiler 214.

Further, in exemplary embodiments of the present invention, the low-pressure exhaust steam from the lower pressure steam turbine 130 will be injected 216 directly into the $CO_2$ stripping tower 212 to strip $CO_2$ before it goes to the water condenser 134. The direct introduction of the steam 133 into the stripper 212 will be able to reduce or eliminate the $\Delta T$ and reduce the reboiler 214 size. Generally, the "low pressure" turbine from which the LP exhaust steam 133 refers to the lowest energy steam available before it goes to the condenser 134, provided that this steam is within an acceptable temperature range to operate within the stripper 212. In preferred embodiments, the LP exhaust steam 133 has a pressure between 1.2 and 14.7 psia, with a temperature between 40 and 100° C. Most preferably, the pressure is between 3 and 7 psia, with a temperature between 60 and 85° C.

The exemplary gas stream 220 from the top of the stripper 212 is a mixture of $CO_2$ and steam with a $CO_2$/steam mole ratio of about 1:3. When the mixture 220 passes through a water condenser 221, the water is condensed, and the $CO_2$ is concentrated. The condenser 221 operates at a pressure lower than that of the stripper 212. The condensed water will be recycled 222 to the power generation system 100 after necessary water treatment. Alternatively, additional water treatment may be omitted. The concentrated $CO_2$ stream from the condenser 221 is cooled 224, and additional water 226 is condensed. The condensed water 226 is then separated in a gas-liquid separator 228, and the pure $CO_2$ 230 is finally drawn from the separator to a vacuum pump 232 to be compressed to a desired pressure.

Figure 2:
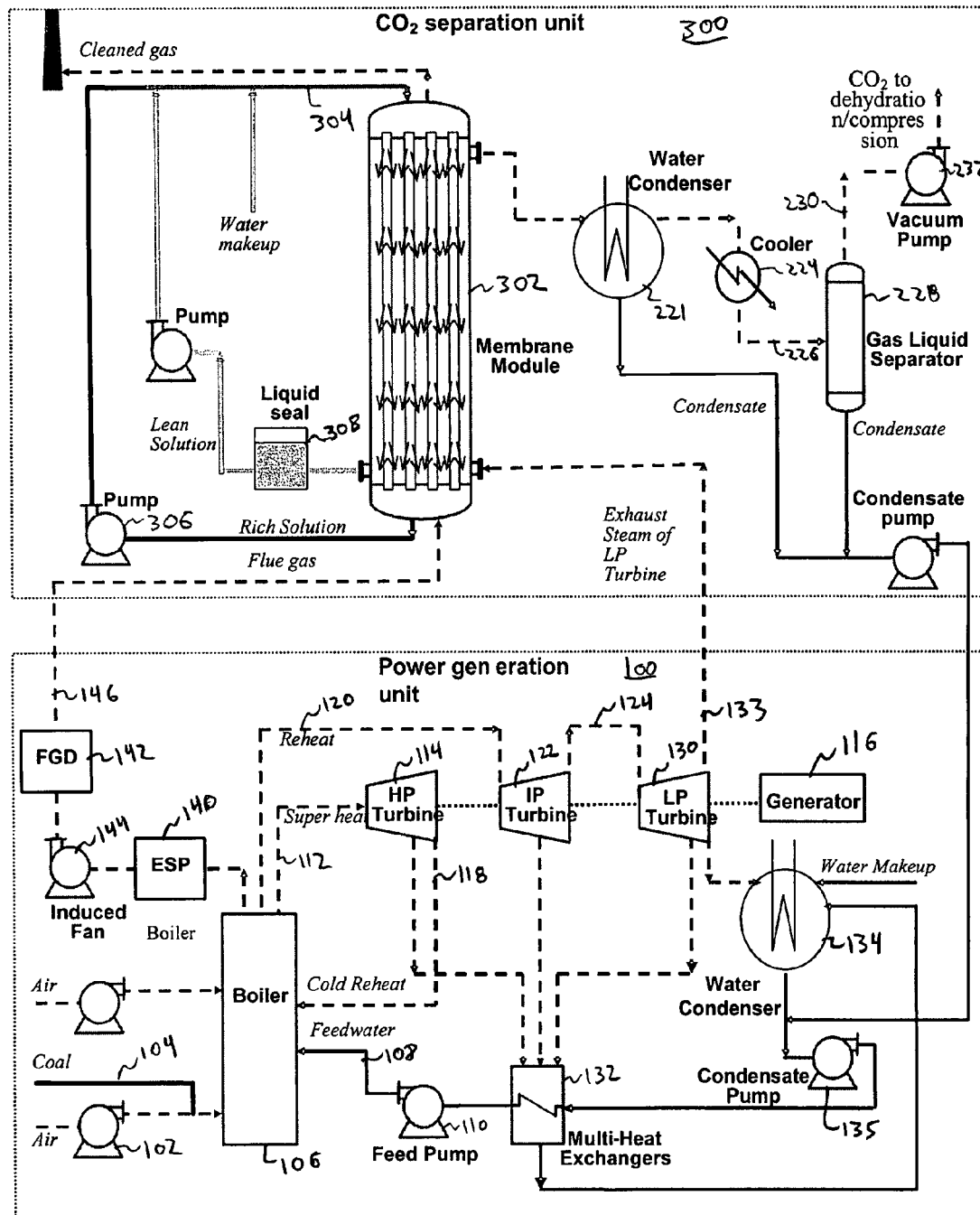
FIG. 2 is a schematic diagram of a membrane-based integrated $CO_2$ separation process, according to an alternative embodiment of the present invention.

FIG. 2 describes another embodiment of the invention, where like parts are represented with like numerals. In FIG. 2, a membrane $CO_2$ separation process 300 is integrated with the steam cycle 100. In this system 300, a membrane module 302, such as but not limited to a membrane contractor or an integrated membrane system, replaces the absorber 202 and the stripper 212 used in the $CO_2$ separation unit 200. Particularly, within the membrane module 302, a $CO_2$ absorption solvent (the $CO_2$ lean solution) 304 is in contact with flue gas at the retentate side to absorb $CO_2$ from gas phase and produces the $CO_2$ rich solution. The $CO_2$ rich solution carries $CO_2$ from the high pressure side (retentate side) to the low pressure side (permeate) through a porous membrane. The low pressure exhaust steam 133 from the LP turbine 130 is used to strip the permeate side of the membrane module 302. Some of the $CO_2$ rich solution may be left at the retentate side and is recycled through a pump 306. A liquid seal 308 is used to block the desorbed $CO_2$ rich gas from the permeate side. Different membranes, such as ultrafiltration membranes and nanofiltration membranes, can be used for the membrane module 302.

To allow the LP exhaust steam 133 to be used to strip $CO_2$ within the stripper 212 or the membrane module 302, one or more significant features of the present invention may be employed. One such feature is that the stripper 212 or the low pressure (permeate) side of the membrane module should operate at a pressure lower than the LP 133 pressure. This allows, for example, the use of absorbents such as potassium carbonate or absorbents with similar properties, and, as will be explained below with respect to exemplary embodiments of the invention, significantly reduces electricity requirements.

Figure 3:
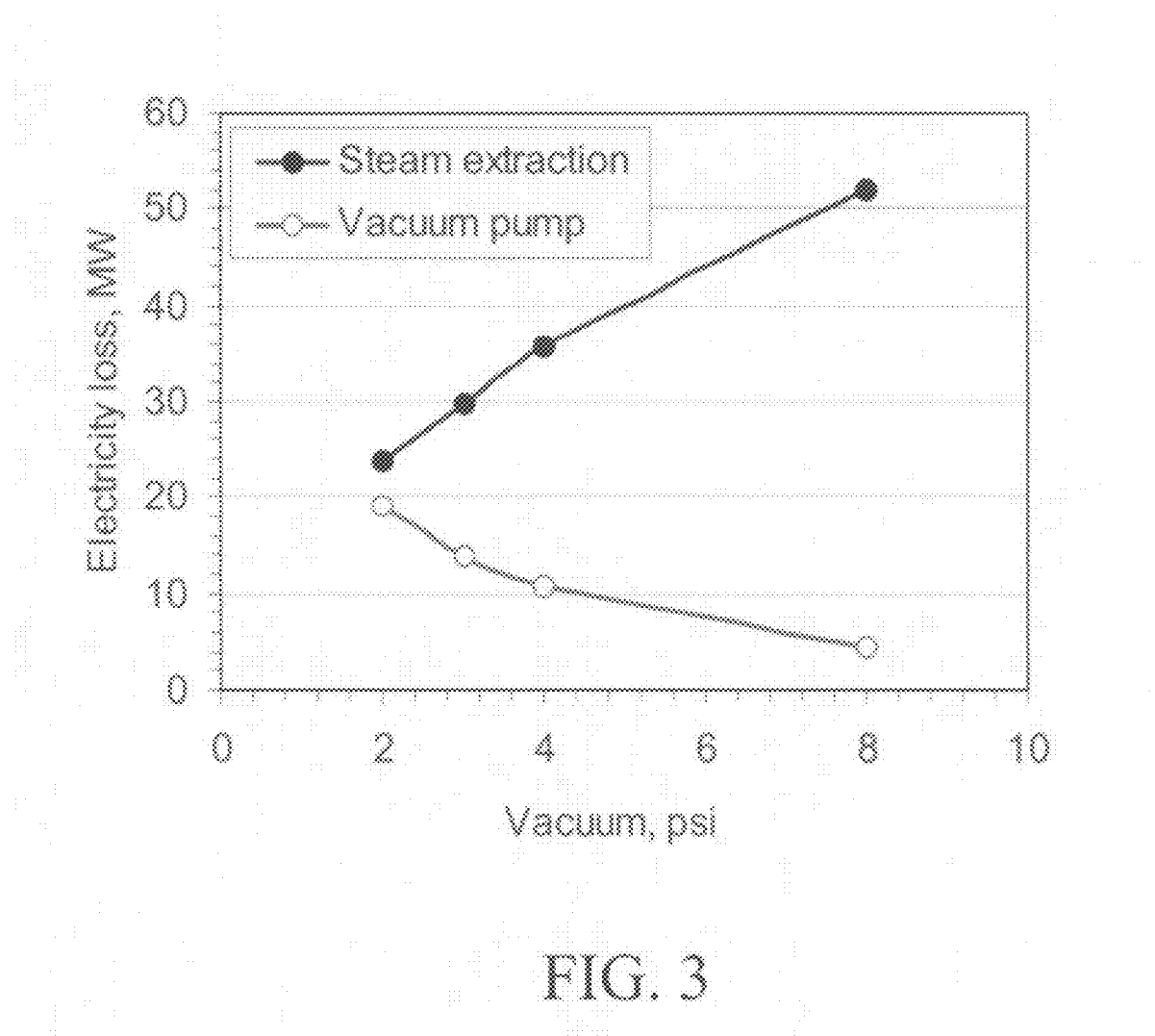
FIG. 3 shows an exemplary relationship between stripper vacuum degree and electricity loss.

In preferred embodiments, the stripper 212 is a vacuum stripper operating at absolute pressures between 2 to 6 psia and corresponding temperatures between 50 to 70° C. For the membrane module 302, preferably the permeate side operates under vacuum at pressure between 1.2 to 14.7 psia, with a preferred pressure between 2 and 6 psia. The vacuum degree is a significant operating parameter in exemplary embodiments of the invention. Higher vacuum will allow the use of lower pressure steam and thus reduce electricity loss. However, the high vacuum will lead also to a larger gas volume and result in larger stripper and vacuum pump sizes. FIG. 3 shows an exemplary relationship between vacuum degree and electricity loss. In preferred embodiments of the present invention, the condenser 221, which automatically contains a vacuum, is used as a "free" vacuum to reduce energy. In certain embodiments, the condenser 221 in the $CO_2$ separation unit 200 may be the same part or part of the condenser 134 in the power plant 100. More particularly, in preferred embodiments, the vacuum of the stripper 212 is partially obtained by condensing water vapor in the gas stream from the stripper.

As an additional consideration, during operation of the absorber 202 (and the retentate side of the membrane module 302), a solvent should be chosen that can absorb the targeted gas (e.g., $CO_2$), yet allow the $CO_2$ to be released under vacuum pressure (or substantially vacuum pressure) within the stripper 212 (or permeate side of the membrane module). For example, different $CO_2$ absorption solutions, such as aqueous solutions of $K_2CO_3$, $Na_2CO_3$, $K_3PO_4$, $Na_3PO_4$, amino-acid salts, and other salts, may be used as long as the absorption solution can adsorb the targeted gas (e.g., $CO_2$) at or near the flue gas conditions, and as long as the absorbed $CO_2$ in the solutions can be stripped by the exhaust steam (1.2-10 psia) from the low pressure steam turbine 130 of the power generation unit 100. Since the steam extracted is saturated steam, the mentioned pressure range corresponding to an operating temperature and pressure of the stripping tower should be comparable with the conditions of the exhaust steam between 40 to 80° C.

Further considerations for reducing energy include increasing the rate at which the $CO_2$ is absorbed in the solvent within the absorber 202. For example, by requiring less contact time between the gas and the solution, the size of the absorption column can be reduced. This may be done, for example, by adding a promoter to the solvent. Exemplary promoters include, but are not limited to, piperazine, monoethanolamine, and other organic base or inorganic base chemicals. Yet another consideration may be to reduce the energy needed to evaporate the water by adding another water soluble additive to the solution to reduce the vapor pressure of the solution. Exemplary additives include, but are not limited to, a water-soluble chemical such as ethylene glycol, or a salt such as NaCl or $K_2SO_4$.

The principle of the current invention can also be used for other gas separation applications. For example, an absorption-based oxygen separation process may use the exhaust steam for oxygen stripping, where the gas stream is air or other oxygen-containing gas mixture. In this case, the absorption solution would be an oxygen-absorbing solution that can absorb $O_2$ from air (for example) at a temperature close to the stripping temperature and can be stripped out at desirable stripper conditions, such as those set out above.

The energy performance of an exemplary method according to the present invention, referred to as a vacuum-carbonate process, for $CO_2$ capture is evaluated applied to a 528 MW (gross) pulverized coal-fired power plant. Steady state process simulations were performed to compare the mass and energy balance of the vacuum carbonate process and a conventional MEA process. The quality of steam heat required for the vacuum process and the associated electricity loss were significantly less than those for the MEA process.

The exemplary vacuum-carbonate process according to an embodiment of the present invention employs a potassium carbonate ($K_2CO_3$) aqueous solution for $CO_2$ absorption. Due to its weaker alkalinity, the heat of absorption of the $CO_2/K_2CO_3$ system (262 Btu/lb) is much less than that of the $CO_2$/MEA system (825 Btu/lb). This reduction in the heat of absorption will reduce the reboiler heat duty. In addition, while the absorption takes place at flue gas conditions similar to MEA processes, the stripper is operated under vacuum. Because of the reduced pressure, the $CO_2$-rich solution boils at a lower temperature than that near the atmospheric pressure. This allows low quality steam to be used as a heat source and can result in reduced electricity loss. Both the low heat of absorption and desorption under vacuum conditions close to the exhaust steam condition make the vacuum-carbonate process an attractive technology.

A process simulation software, CHEMCAD (version 5.3.7), developed by Chemstations Inc., was used to perform steady state process simulations for a reference PC power plant, with an MEA process, and with an exemplary vacuum-carbonate process. FIG. 4 shows the major operating conditions employed in these simulated processes. Other process parameters, such as stripping temperature, heat duty of the reboiler, and steam extraction pressure, were derived from process simulations.

The reference plant is a standard air-blown PC power plant with a 528 MWe gross output. A typical Illinois coal was selected as the fuel. This coal has a moisture content of 6.08%, an ash content of 8.90%, and an HHV of 12,475 Btu/lb. The coal was expressed in an equivalent molecular formula as $C_{164}H_{134}O_{11}N_3S_2$ on a dry ash-free basis. The coal combustion in the boiler was modeled by the Gibbs free energy reactor module, which determines the equilibrium state through the minimization of the Gibbs free energy of the reaction system. The expander module was used to simulate the steam turbines. The expansion was assumed as adiabatic expansion. The heat exchanger module was applied to heat exchanges in the boiler.

The $CO_2$ absorption and stripping columns of the vacuum-carbonate process were modeled by the rigorous multi-stage vapor-liquid equilibrium module (SCDS). The vapor-liquid equilibrium (VLE) calculation was selected in the SCDS module in this experiment. Fifteen stages were assumed for both the adsorption and the stripping columns. While the level of $CO_2$ removal was fixed in absorption, the liquid-to-gas ratio (L/G) was adjustable by varying the stage equilibrium efficiency. The thermodynamic equilibrium constant values (K values) were calculated using the electrolyte Non-Randomness Two-Liquid (NRTL) model for the liquid phase and the ideal vapor model for the gas phase. The binary interaction parameters for the species in the $H_2O$—$CO_2$—$K_2CO_3$ solution were adopted from the CHEMCAD database. The enthalpy and entropy modeling was based on the latent heat method. The chemical reaction equilibrium constants and transport properties of the system, both of which are temperature-dependent, were based on the regression equations incorporated in CHEMCAD.

The SCDS module was also used for modeling the MEA process. The procedure of the VLE calculation was similar to that for the vacuum-carbonate process. The thermodynamic equilibrium K values were calculated by the amine K-value model, which is based on the Soave-Redlich-Kwong (SRK) equation of state. The chemical reaction equilibrium constants involved in the $CO_2$-MEA aqueous solution were built into the CHEMCAD package. The enthalpies of chemical components were estimated by the amine enthalpy model, which employs the SRK equation for the vapor enthalpy and the method of Crynes and Maddox for the liquid enthalpy.

Results
Reference PC Power Plant

Figure 5:
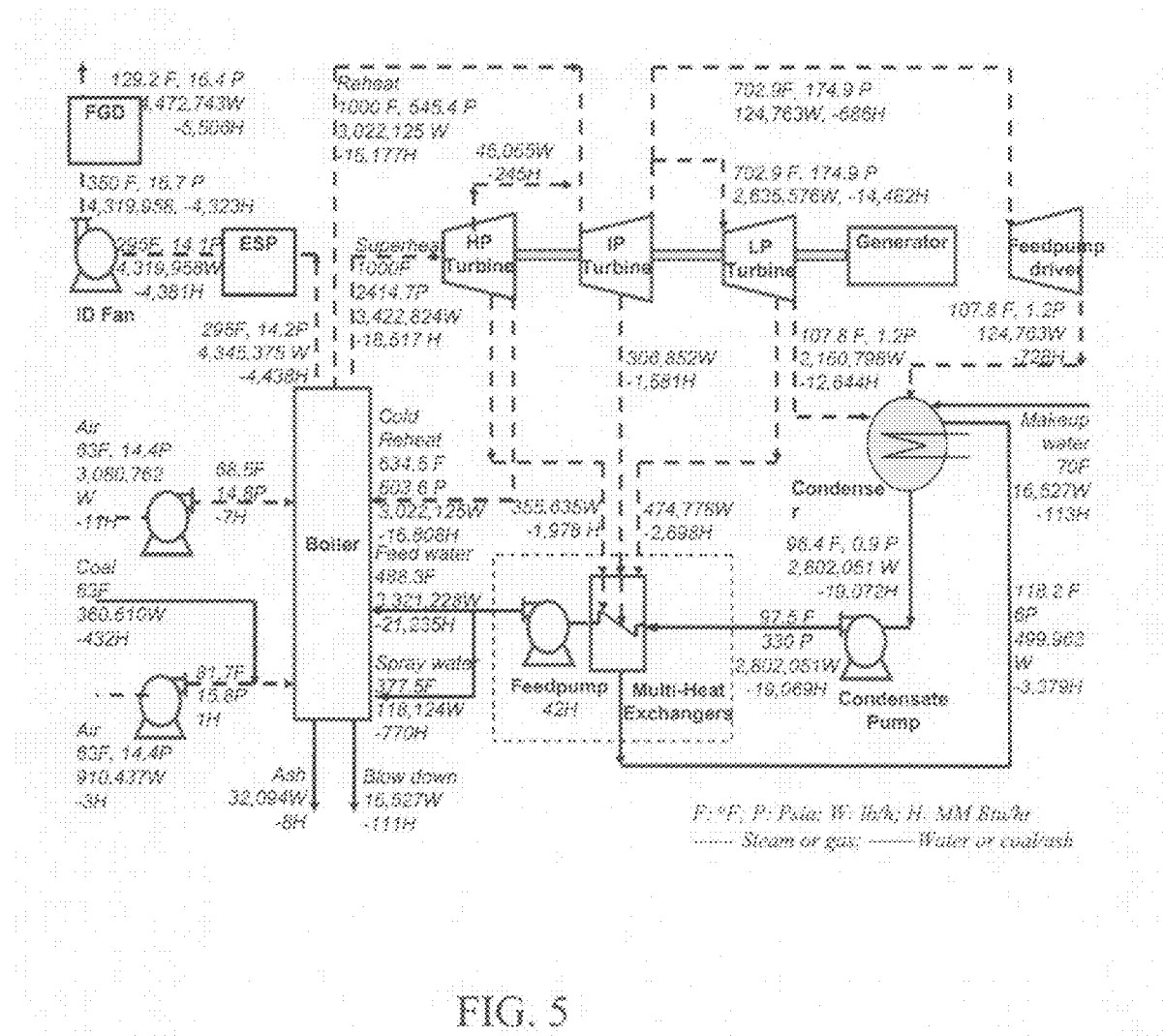
FIG. 5 shows results of energy and mass balance calculations for a reference pulverized coal (PC) power plant.

The results of the energy and mass balance calculation are shown in FIG. 5. The plant operating at full capacity demanded a heat input of 4,499 MMBtu/hr (180 ton/hr as-received coal). Complete combustion of coal was assumed in the simulation. The flue gas exited from the boiler at a flow rate of 5.04 million scfh, composed of 14.6% vol of $CO_2$, 75.7% of $N_2$, 2.7% of $O_2$, 6.8% water vapor, 1,774 ppm $SO_2$, 325 ppm NO, and 5.2 g/m³ fly ash. Most of the ash and $SO_2$ were then removed in the ESP and FGD devices. The clean gas leaving the FGD had a slightly increased volume (5.34 million scfh) due to water evaporation in the FGD absorber. This gas stream contained 13.9% vol of $CO_2$, 71.4% of $N_2$, 2.5% of $O_2$, 12.2% water vapor, 34 ppm $SO_2$, and 31 ppm NO. The flue gas was blown to provide the pressure drop of 2 psia required by the $CO_2$ capture process downstream. However, the associated electricity use was counted into the $CO_2$ process discussed below.

In the steam cycle, the main steam (1000° F., 2415 psia) was fed to the HP turbine. The cold steam exiting from the HP turbine (635° F., 604 psia) was reheated to 1000° F. (545 psia) and went to the IP and the LP turbines in series. The exhaust steam from the LP turbine (108° F., 1.2 psia) was condensed in the water condenser and then fed back to the boiler after being preheated through seven consecutive heat exchangers. For simplicity and illustrative purposes, the calculated results for these heat exchangers are combined in FIG. 5. Through the steam cycle, a gross electricity output of 527.6 MW was generated, of which 150.6 MW was from the HP turbine, 124.7 MW was from the IP, and 252.3 MW was from the LP. However, due to the in-plant electricity use by equipment such as pumps, blowers, and fans, the net electricity output decreased to 492.9 MW. In accordance, the net thermal efficiency, i.e., the conversion of the total heat input to the net electricity output, was 37.4%.

Figure 6:
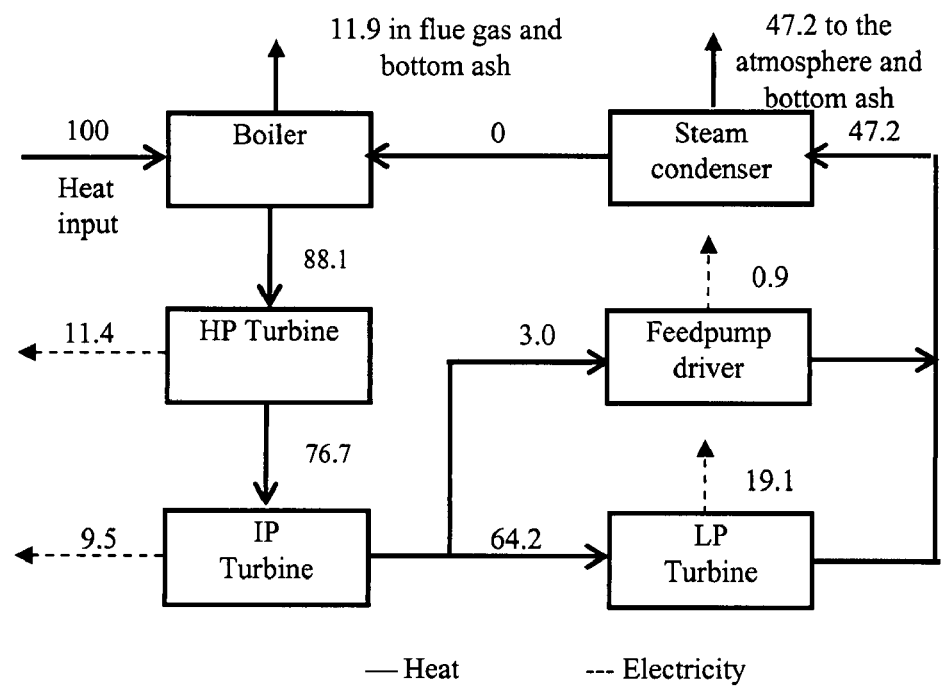
FIG. 6 shows energy distributions in the PC power plant of FIG. 5.

FIG. 6 summarizes the heat distribution of the power generation system derived from the above mass and energy balance calculations. The result shows that only 41% of the total heat input was converted to usable energy forms, particularly 40% to electricity through the turbines and 1% to work through the feed-water pump. A large amount of the heat (47%) was wasted in the exhaust steam from the LP turbine, since the low temperature of the steam (108° F.), close to the ambient, made it non-usable in the current plant. This heat was released in the exhaust steam condenser and finally dissipated into the atmosphere through the heat exchange between the cooling water and the air.

Figure 7:
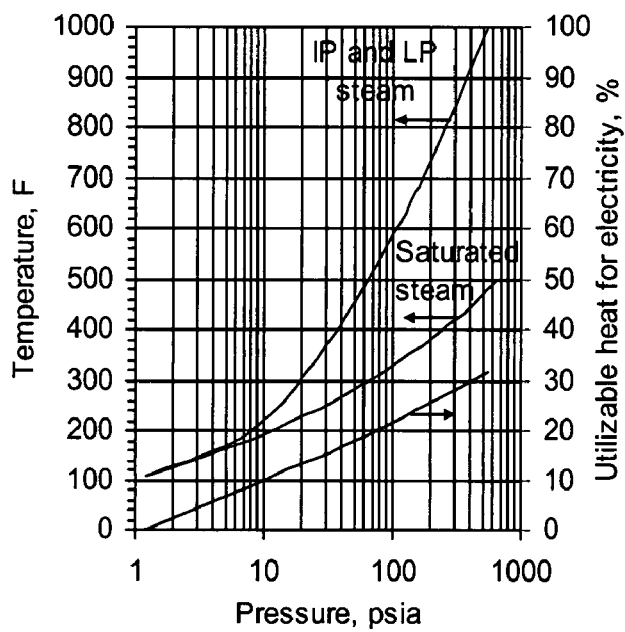
FIG. 7 shows steam properties during expansion in IP and LP turbines.

Since the heat contained in steam can vary in quality, it is meaningful to see how such quality changes with the steam conditions. FIG. 7 shows the change of steam properties and its capability of generating electricity when it passes through the IP and LP turbines. Here, an adiabatic expansion process was assumed, and the expander had an efficiency of 88.5%. During the expansion, the capability of the steam to generate electricity decreases logarithmically with the decrease of steam pressure. At the IP inlet (1000° F., 545.4 psia) about 32% of the total heat contained in the steam can be converted to electricity, while little or no such heat can be converted to electricity at the outlet of the LP turbine (107.8° F., 1.2 psia). However, according to embodiments of the present invention, the large amount of heat contained in the exhaust steam may be used as an energy source for a $CO_2$ separation process if appropriate stripping conditions in a $CO_2$ absorption process are designed. Examples of such conditions are explained below with regard to the exemplary vacuum-carbonate process.

MEA Process

The simulation of the MEA process was based on the flue gas leaving the wet FGD from the reference plant. Since the flue gas was cooled to 129° F. through the FGD absorber, no further cooling was assumed before the flue gas entered the MEA process. Again, the inlet flue gas contained 13.9% vol $CO_2$, equivalent to a partial pressure of 2.3 psia.

Figure 8:
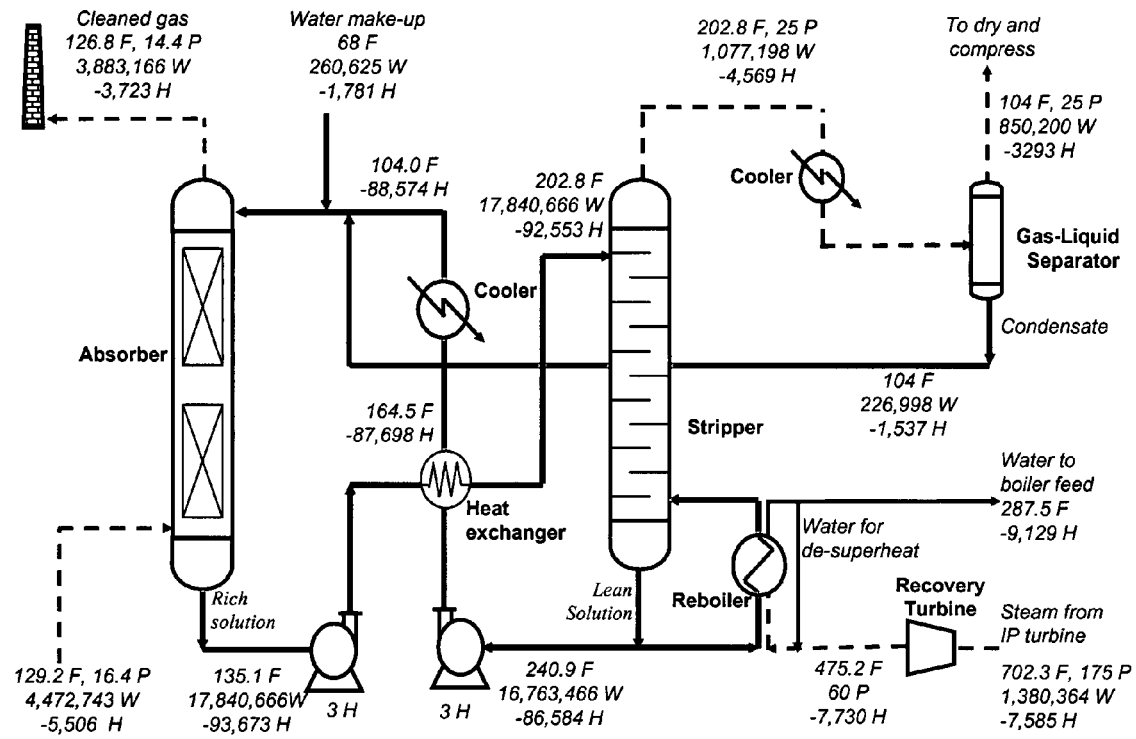
FIG. 8 shows mass and energy balance calculations for a simulated monoethanolamine (MEA) system and process.

The results of the process mass and energy balance calculation are shown in FIG. 8. 90% of the $CO_2$ in the flue gas was removed in the absorption column. The cleaned flue gas contained 74.1% vol $N_2$, 21.7% water vapor, 2.6% $O_2$, and 1.6% $CO_2$. MEA regeneration from the rich solution required a heat duty of about 1,400 MMBtu/hr in the stripper reboiler, which is equivalent to 1,680 Btu/lb $CO_2$ removed. The gas stream from the stripper contained 58.7% vol $CO_2$ and 41.3% $H_2O$. The stream was cooled to 104° F. to condense water vapor, and the $CO_2$ was concentrated (95.7% vol $CO_2$ and 4.3% $H_2O$).

The steam used for MEA regeneration was extracted from the power plant. The steam condition was determined based on the required temperature for the stripper. As most of the heat from steam was stored as the latent heat that would be released during condensation, the saturation temperature of the steam was kept above the solution temperature at the bottom of the stripping tower. In addition, a temperature difference of 40-50° F. is typical for a stripper reboiler in the MEA process. As a result, steam with a saturation temperature of about 290° F. was needed for the reboiler. The corresponding saturation pressure of the steam was about 60 psia (FIG. 7). Since the steam extracted from the exit of the IP turbine was at 175 psia, it was therefore expanded to 60 psia with a temperature of 475° F. This steam was further desuperheated prior to entering the reboiler. Part of the electricity was recovered during the steam expansion. The steam was then used to heat the MEA solution and was condensed itself in the reboiler. The condensate from the reboiler was returned to the feed water system in the power plant steam cycle. In this simulation, it was assumed that no steam was directly introduced to the stripper to strip $CO_2$.

Figure 9:
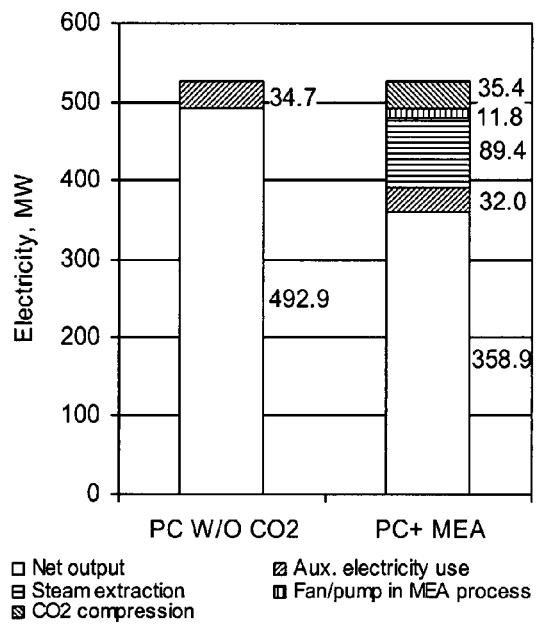
FIG. 9 shows electricity output and use in a power plant with and without the MEA system shown in FIG. 8.

The extraction of steam resulted in a large reduction in electricity generation. With more than half the total steam extracted from the exit of the IP turbine, the gross electricity generation was reduced by 89.4 MW (power recovery was considered). Another large electricity loss was caused by $CO_2$ compression. The assumed four stage inter-stage cooling compressor consumed a total of 35.4 MW of electricity to compress all the captured $CO_2$ from 25 to 1200 psia. In addition, 10.0 MW was required for the flue gas blower to overcome a pressure drop of 2 psia in the MEA absorber, and 1.8 MW for the MEA solution pumps. However, the other auxiliary power use in the PC+MEA plant was slightly less than the reference plant. This is because the steam extraction demanded by the MEA process reduced the loading of the exhaust steam condenser and cooling tower in the power plant, which in turn reduced the electricity usage. The results of the electricity use/loss are summarized in FIG. 9. Overall, the net electricity output in the PC+MEA power plant was reduced by 134 MW, equivalent to a loss of 27.2% of the net electricity output from the reference PC plant.

Vacuum Carbonate Process

Figure 10:
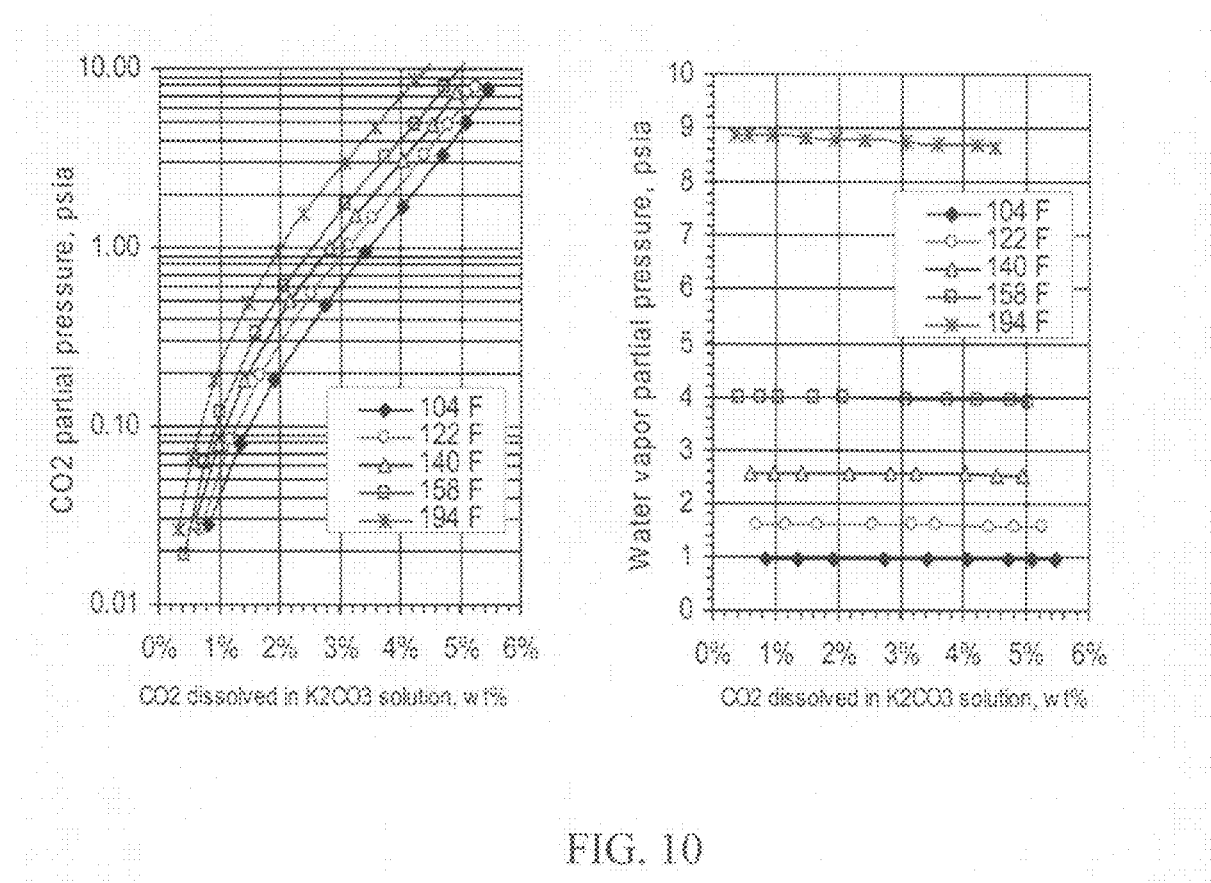
FIG. 10 shows $CO_2$ and water partial pressures over a 20% wt $K_2CO_3$ aqueous solution, according to an embodiment of the present invention.

The $CO_2$ and water partial pressures in the vapor over a 20% wt $K_2CO_3$ solution at equilibrium were calculated and are shown in FIG. 10. The predicted $CO_2$ partial pressure agreed well with the experimental data at 158 and 194° F. reported by Tosh, J. S., Field, J. H., Benson, H. E., Haynes, W. P., Equilibrium Study of the System Potassium Carbonate, Potassium Bicarbonate, Carbon Dioxide, and Water, United States Bureau of Mines, Report of Investments, No. 5484, 1959, while the predicted water vapor pressure only slightly deviated upward at high $CO_2$ loadings. The equilibrium data showed that at a temperature range of 104-194° F., the total pressure of $CO_2$ and water vapor changed from about 1-9 psia when $CO_2$ loading in the solution was kept at 1% wt at the exit of the stripper.

When the absorption was operated around the atmospheric pressure, the $CO_2$ partial pressure decreased from about 2.3 to 0.23 psia to achieve 90% removal efficiency. Assuming that the gas phase $CO_2$ and the absorption solution were at equilibrium at the bottom of the column, then the loading of $CO_2$ in the $CO_2$ rich solution ranged from 2.6% wt to 4.2% wt in the temperature range of 194-104° F. (FIG. 10). Compared with the MEA solution, the $K_2CO_3$ solution has a lower $CO_2$ absorption capacity, and a higher liquid flow rate is needed to achieve the same $CO_2$ removal.

Figure 11:
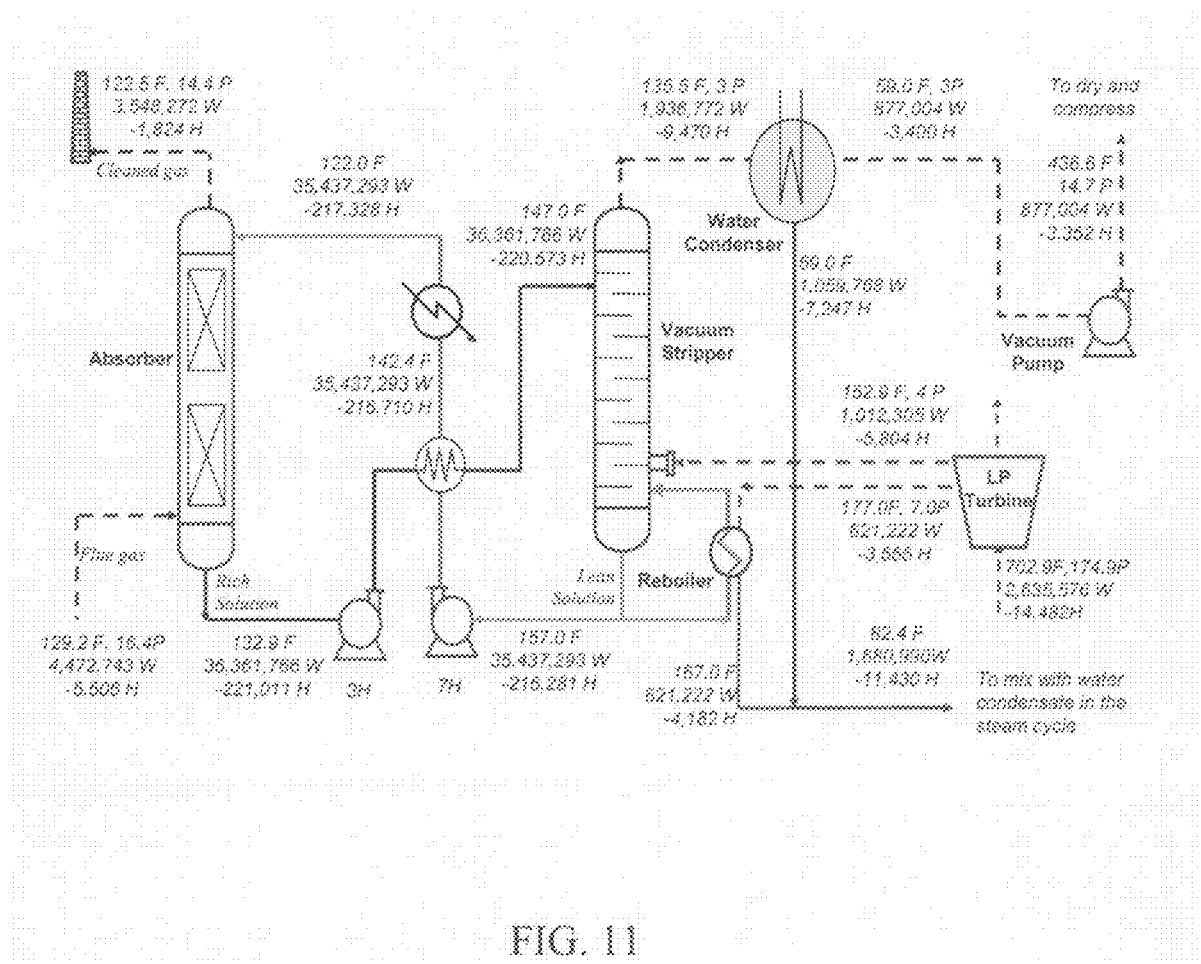
FIG. 11 shows mass and energy balances for an exemplary vacuum carbonate process, according to an embodiment of the present invention.

FIG. 11 shows operation of an exemplary vacuum-absorption process according to this exemplary embodiment of the present invention. The low-pressure steam used in the stripper was extracted from the LP turbine, typically at pressure ranging from 3-9 psia. These pressures are much lower than the steam used in the MEA process, where the steam pressure was 60 psia. In the exemplary vacuum-carbonate process, most of the steam is directly introduced into the stripper for stripping and heating. Only a small part of the steam (e.g., about ⅓) was used for indirect heating in the reboiler. This is quite different from the MEA process, for example, where the majority of the steam is introduced to the reboiler at the bottom of the stripper for indirect heating.

As a nonlimiting example, mass and heat balances for the vacuum process operated at 3 psia (at the top of the stripper) were listed in FIG. 11. The calculations were based on a 20% $K_2CO_3$ solution and 1% wt of $CO_2$ loading in the lean solution. The liquid to gas mass ratio (L/G) used in this example was 1.2 times the minimum L/G ratio, $(L/G)_{min}$. This ratio (7.92) roughly doubled that of the MEA process (3.86). The results showed that about 1.6 million lb/hr steam were consumed for $CO_2$ regeneration, of which 62% was directly introduced into the stripper, and 38% went to the reboiler. A temperature difference (ΔT) of 20° F. was adopted for the heat transfer in the reboiler, since the lower heat duty (627 MMBtu/hr) of the vacuum process gives some flexibility for the reboiler. For comparison, the heat duty of the MEA process is 1,400 MMBtu/hr.

The gas stream from the top of the stripper was a mixture of 24.1% vol $CO_2$ and 75.9% vol water vapor. The majority of the water vapor in the stream was condensed in the water condenser, and the condensate was mixed with the condensate from the reboiler and returned to the steam cycle of the power plant. After the primary condensation, the gas stream included 91.7% vol $CO_2$ and 8.3% water vapor. The temperature of the mixed condensate was about 82° F., a temperature close to the exhaust steam condenser in the power plant. In an exemplary real (not simulated) process, the condensate from the $CO_2$/water vapor stream, containing 388 ppm $CO_2$ in water, may need treatment to meet the water quality requirement of the steam cycle. Exemplary treatments will be apparent to those of ordinary skill in the art.

In the above calculations, the amounts of steam used in the stripper and reboiler were optimized to maintain a water balance in the absorption-desorption loop. Introduction of excessive steam into the stripper would result in water accumulation in the process. However, indirect heating through the reboiler would reduce the thermal efficiency of the steam usage, since a temperature difference (ΔT) is necessary. For example, an increase of ΔT to 40° F. could lead to an additional 4 MW electricity loss compared to the ΔT of 20° F. used in this calculation. Due to this fact, as much of the steam as possible was directly introduced to the stripper to reduce or eliminate the ΔT and reduce the reboiler heat duty.

Based on the results shown in FIG. 12, the thermal efficiencies of the power plants equipped with the vacuum carbonate process and the MEA process were compared. The results of the comparison are shown in FIG. 13. The electricity needed for compressing the $CO_2$ to 1200 psia was also included. The different electricity use for $CO_2$ compression between the two processes was due to the different starting pressures (14.7 and 25 psia, respectively). The steam extraction loss in the vacuum carbonate process was as low as about 38 MWe, of which 52% was due to the stripping steam and 48% due to the reboiler steam. However, in the vacuum carbonate process, a significant amount of electricity was consumed by the vacuum pump to pressurize the $CO_2$ stream from the stripping pressure to one atmospheric pressure (14.7 psia). The exemplary vacuum carbonate process also required large pumps to circulate the absorption solution due to its higher L/G ratio. The thermal efficiencies of the two processes were 29.6% and 27.2%, respectively. Overall, about 104 MWe in total was consumed for $CO_2$ capture in the vacuum carbonate process, compared to 137 MWe in the MEA process, an energy saving of about 24%.

All of the above calculations were conducted at a stripping pressure of 3 psia, a $CO_2$ lean loading of 1.0% wt, and an L/G ratio of 1.2 $(L/G)_{min}$. Since these three parameters are significant operating parameters for the vacuum carbonate process, their impacts on energy performance were investigated in more detail.

Effect of Stripping Pressure

The effect of the stripping pressure on steam extraction loss and electricity use of the vacuum pump, the two most energy-consuming components in the process, were examined for a stripping pressure range of 2-8 psia. The steam extraction loss was calculated based on the amount of steam expanded from the extraction pressure to 1.2 psia. The electricity use by the vacuum pump was calculated based on the process to compress the $CO_2$ stream to one atmospheric pressure. Since the absorber and vacuum stripper were operated at similar temperatures (closer at a lower stripping pressure), the heat duty of the heat exchanger for the $CO_2$ lean and rich solutions was significantly reduced compared to the MEA process. The ΔT between the lean solution inlet and rich solution outlet was thus selected as 10, 15, and 20° F. for the process simulations at stripping pressures of 3, 4, and 8 psia, respectively, and no lean-rich solution heater exchanger was required at 2 psia.

The process simulations showed that the steam extraction loss increased with increasing stripping pressure to a power of 0.59, while the electricity use of the vacuum pump decreased with increasing operating pressure to a power of −1.07 (FIG. 12). Overall, the total electricity loss increased with increasing stripping pressure to a power of 0.29. The total electricity loss changed from 50 to 74 MW as the stripping pressure increased from 2-8 psia at an L/G ratio of 1.2 $(L/G)_{min}$. This corresponds to about 56%-82% of the steam extraction loss of the MEA process.

Only considering the energy consumption for the selected operating pressure range, it is expected that a lower stripping pressure will allow the use of lower quality steam, which will result in a higher thermal efficiency of the power plant. On the other hand, the lowest operating pressure has a boundary, since the steam condensation is limited by the cooling water temperature, which depends on the water sources and the season as well. The lowest stripping pressure is also limited by the fact that a lower stripping pressure will lead to a larger stripper, which in turn increases the capital cost. An optimal stripping pressure should thus exist, at which pressure the best economic performance can be achieved.

Effect of $CO_2$ Loading in the Lean Solution $CO_2$ loading in the lean solution affects the equilibrium vapor pressure of $CO_2$ in the gas phase, and thus impacts the minimum liquid-to-gas ratio, $(L/G)_{min}$, in the absorption column. A lower loading of $CO_2$ in the lean solution favors $CO_2$ absorption, resulting in a reduced $(L/G)_{min}$, and thus the real L/G ratio, to achieve the same level of $CO_2$ absorption (FIG. 14). The $CO_2$ loading in the rich solution only changed slightly with decreasing $CO_2$ loadings in the lean solution.

The mass and energy balance calculation showed that a lower lean $CO_2$ loading at the stripper bottom shifted the temperature profile upward in the column compared to a higher $CO_2$ loading. For example, at a stripping pressure of 3 psia, the temperatures at the bottom and top of the column increased by about 3° F. and 10° F., respectively, when the lean $CO_2$ loading varied from 1.5 to 0.5%. Therefore, more heat was required to provide for greater water vaporization and the greater heat duty of the reboiler. Although the L/G ratio decreased with decreasing lean $CO_2$ loading, the resulting reduction of sensible heat was relatively not significant compared to the increased requirement for water latent heat. As a result, a decrease of $CO_2$ loading from 1.5% to 0.5% almost doubled the steam extraction loss (FIG. 15). While a lower $CO_2$ loading is not economic, it can also be noted that a $CO_2$ loading above 1.5% would not greatly improve the energy use performance of the process.

Effect of L/G Ratio

Figure 16:
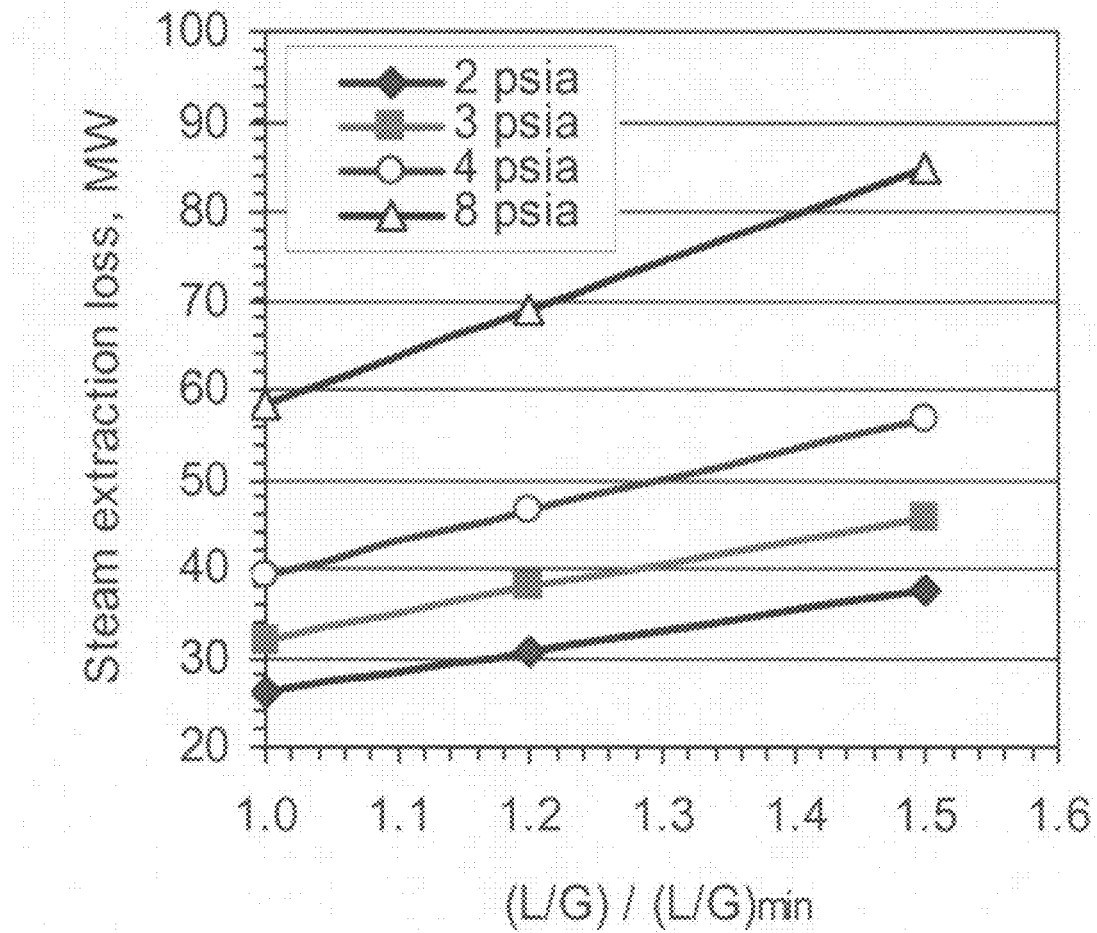
FIG. 16 shows the effect on steam extraction loss at different L/G ratios.

The L/G ratio affects both the treated gas purity and the heat requirement of the absorption process. In any chemical absorption process, the L/G ratio typically ranges from 1.1-1.5 times the $(L/G)_{min}$. The L/G ratios examined in this experiment were 1.0, 1.2, and 1.5 times $(L/G)_{min}$. The impact on the heat requirement of the stripper is shown in FIG. 16.

At 90% $CO_2$ removal and a 1% $CO_2$ lean loading in solution, the $CO_2$ rich loading at the stripper inlet decreased from 3.8% to 2.8% as the L/G increased from 1.0 to 1.5 times $(L/G)_{min}$. The temperature at the stripper bottom was related only to the $CO_2$ lean loading in the equilibrium calculation, and thus remained the same. A lower $CO_2$ loading in the rich solution required a slightly higher temperature in the stripping column to drive out the $CO_2$ from solution. Therefore, more water vaporization was expected at a higher L/G ratio. On the other hand, a higher L/G ratio required more sensible heat for heating the solution. However, as mentioned above, the sensible heat contributed less than 20% of the total heat requirement for operations at 1% $CO_2$ loading, and therefore was not considered significant. Combining the increased heat requirement for water vaporization and solution heating, the electricity loss due to steam use increased by about 45% for a change in the L/G ratio from 1.0 to 1.5 times $(L/G)_{min}$.

Preliminary Cost Estimation

A preliminary cost comparison was made between the MEA process and the vacuum-carbonate process (FIG. 17). The IECM model (e.g., as described in Singh, D., Croiset, E., Douglas, P. L., Douglas, M. A., Techno-Economic Study of $CO_2$ Capture from An Existing Coal-Fired Power Plant: MEA Scrubbing vs. $O_2/CO_2$ Recycle Combustion, Energy Conversion and Management 2003, 44, 3073-3091) was employed to estimate the cost of the MEA process, based on default financial assumptions built into the model and the process parameters input from this experiment. The resulting breakdown costs for the MEA process were comparable to those previously reported (e.g., see Rao, A. B., Rubin, E. S, Identifying Cost-Effective $CO_2$ Control Levels fro Amine-Based $CO_2$ Capture Systems, Ind. Eng. Chem. Res. 2006, 45, 242-2429). The cost analysis of the exemplary vacuum-carbonate process was based on a pressure of 3 psia at the top of the stripper, a 20 wt % $K_2CO_3$ solution, a lean loading of 1% $CO_2$ in the solution, and an L/G ratio of 1.2 times $(L/G)_{min}$. For a preliminary estimation, the capital cost of the vacuum process was assumed 50% greater than the MEA process, allowing for a larger gas volume under a vacuum condition and the additional expenditure for the vacuum pump. The fixed O&M cost was assumed to be proportional to the capital cost. The energy cost in the vacuum carbonate process was obtained by comparing the electricity loss/use (104 MW) to that of the MEA process (137 MW). Because there are no degradation/polymerization problems in the process, the carbonate solvent is only lost through stoichiometric reaction with $SO_2$. The resulting replacement cost of solvent was estimated based on a mass-based price of ⅙ of the cost of MEA. The other variable cost in the vacuum carbonate process was the use of corrosion inhibitor, which was assumed as 20% of the solvent cost. The cost results showed that a significant amount of the cost for the vacuum carbonate process was contributed by the capital investment. Due to its lower energy requirement and lower solvent loss, the variable costs for the vacuum process were nearly half those of the MEA process. As a result, the $CO_2$ avoidance cost of the vacuum carbonate process was 18% less than the MEA process. Additional information on kinetic-based equipment sizing would be useful to obtain more detailed cost estimates.

An improved process for the amine-based $CO_2$ capture process was developed by Mitsubishi Heavy Industries and the Kansai Electric Power Company. This process employs the KS-1 solvent, an undisclosed amine with steric hindrance. The energy use for $CO_2$ capture (not including $CO_2$ compression) was reported to be 195 kWh/ton $CO_2$. The total cost is reduced by 20% compared to the MEA process. It can be seen that the techno-economic performance of the exemplary vacuum-carbonate process in this simulation is comparable to the amine-based process where KS-1 is used.

CONCLUSIONS

About half of the steam generated in the power plant at a typical operating condition is extracted by the exemplary vacuum-carbonate process, among which 60% is directly introduced into the stripper. Because of this steam extraction, the steam condenser in the reference PC power plant will have excess capacity (about 40%). When the vacuum-carbonate process is retrofitted to an existing power plant, the excess capacity of the existing condenser can be used to condense the $CO_2$/water stream from the stripper. Since the operating conditions are similar for the two condensation steps, the exhaust steam condenser in the existing power plant may be used with minimal modifications. If the vacuum-carbonate process is used in a new power plant, then more than half of the exhaust steam condenser can be eliminated, and instead a $CO_2$/water condenser should be added. The resulting plant integrates the exemplary vacuum-carbonate absorption process and the power plant steam cycle. Such integration is not possible for an MEA process.

The potassium carbonate solution used in this modeling experiment has a slower chemical reaction rate with $CO_2$ than the MEA solution. At a flue gas temperature of around 122-140° F. (downstream of a wet FGD), the chemical reaction rate could be slow and become the rate-limiting step for the absorption process. As a result, the absorber for the vacuum process should be larger than the absorber for the MEA process. To reduce the absorber size, developing a good promoter/activator is a significant factor for a preferred vacuum-carbonate process. Many promoters have been tested and some have been commercialized. Nonlimiting examples may be found in Kohl, A. L., Riesenfeld, F. C., Gas Purification (Fourth Edition), Gulf Publishing Company, Houston, Tex., 1985.

Some earlier studies achieved major improvements for the hot potassium process. For example, addition of sodium or potassium arsenite as an activator in $K_2CO_3$ solution has been shown to increase the rate of $CO_2$ absorption and desorption by about 4 times, resulting in appreciable improvements in regeneration heat, equipment size, and treated gas purity.

Another example is the Catacarb potassium carbonate process, where an undisclosed additive was used to catalyze absorption and desorption of the acid gases, especially of $CO_2$. Recently, Cullinane and Rochelle demonstrated that a 20 wt % $K_2CO_3$ solution promoted with 0.6 M piperazine (PZ) could achieve absorption rates comparable to those in 5M MEA at temperatures of 40-80° C. More concentrated solvents, such as 3.6 M K$^+$/1.8M PZ, had absorption rates a factor of 1.5 higher than 5M MEA. Thus, it is possible to promote the absorption rate of the carbonate solution to a magnitude comparable to that of an MEA solvent.

Another potential issue is that vacuum in the stripper will significantly increase the gas stream volume especially when the vacuum is high. At 3 psia, the total $CO_2$ volume will be more than 600,000 acfm for a 500 MW power plant. At a 5 m/s gas velocity, the total cross section area at the inlet of the vacuum pump will be about 600 ft$^2$. Clearly, too high a vacuum will make the capital cost of the vacuum pump high.

The concentration of the carbonate solution is limited by $KHCO_3$ dissolution. Higher $K_2CO_3$ concentration in solution is possible based on the typical operating conditions employed in this process. For example, at 130° F. and 50% conversion of $K_2CO_3$ to $KHCO_3$, the $K_2CO_3$ concentration in solution can reach about 35%. A higher $K_2CO_3$ concentration in solution will increase the working capacity (difference of lean and rich $CO_2$ loadings) and decrease the L/G requirement. If a 30% $K_2CO_3$ solution is used, the energy use and cost will be further reduced, compared to the 20% $K_2CO_3$ solution used in the above process simulation and cost analysis.

In sum, process simulations showed that, when an exemplary vacuum-carbonate process is operated at a stripping pressure of 3 psia, a 1.0% $CO_2$ lean loading and an L/G at 1.2 $(L/G)_{min}$, the electricity loss due to steam extraction is only about 42% of that in the MEA process. The total electricity loss of the vacuum-carbonate process, including the $CO_2$ compression, is about 76% of that of the MEA process.

The impacts on the energy performance of the vacuum-carbonate process were investigated for three process parameters: stripping pressure, $CO_2$ loading, and L/G ratio. Increasing the stripping pressure resulted in an increase of steam usage and quality, and a decrease of electricity use for the vacuum pump. Overall, as stripping pressure rose from 2-8 psia, the total electricity loss increased at a power of 0.22. A decrease of $CO_2$ lean loading from 1.5% to 0.5% almost doubled the steam extraction loss. However, a $CO_2$ lean loading higher than 1.0% did not significantly improve the energy performance of the process. Increasing the L/G ratio from 1.0-1.5 times the $(L/G)_{min}$ increased the electricity loss due to steam extraction by 45%.

The preliminary cost analysis showed that the vacuum-carbonate process is economically attractive for post-combustion $CO_2$ capture with an 18% reduction of the $CO_2$ avoidance cost compared to the MEA process.

While various embodiments of the present invention have been shown and described, it should be understood that other modifications, substitutions, and alternatives are apparent to one of ordinary skill in the art. Such modifications, substitutions, and alternatives can be made without departing from the spirit and scope of the invention, which should be determined from the appended claims.

Various features of the invention are set forth in the appended claims.

What is claimed is:

1. A method for separating a targeted gas from a gas stream emitted from a power plant, the method comprising:
bringing the gas stream into contact with an absorption solution to preferentially absorb the targeted gas to be separated from the gas stream so that an absorbed gas is present within the absorption solution, providing a gas-rich solution;
introducing the gas-rich solution into a stripper;
injecting low pressure exhaust steam from a low pressure steam turbine of the power plant into the stripper with the gas-rich solution;
stripping the absorbed gas from the gas-rich solution in the stripper using the injected low pressure steam within the stripper to provide a gas stream containing the targeted gas, wherein the stripper is at or near vacuum;
condensing water vapor in a gas stream from the stripper in a condenser operating at a pressure lower than the stripper to concentrate the targeted gas:
separating condensed water from the concentrated targeted gas;
wherein the stripper during said stripping is at a pressure between 1.2 and 14.7 psia, and a temperature T=40~100° C.

2. The method of claim 1, wherein the low pressure exhaust steam is between 1.2 and 14.7 psia, and a temperature T=40~100° C.

3. A method for separating a targeted gas from a gas stream emitted from a power plant, the method comprising:
bringing the gas stream into contact with an absorption solution to preferentially absorb the targeted gas to be separated from the as stream so that an absorbed gas is present within the absorption solution, providing a gas-rich solution;
introducing the gas-rich solution into a stripper;
injecting low pressure exhaust steam from a low pressure steam turbine of the power plant into the stripper with the gas-rich solution;
stripping the absorbed gas from the gas-rich solution in the stripper using the injected low pressure steam within the stripper to provide a gas stream containing the targeted gas, wherein the stripper is at or near vacuum;
condensing water vapor in a gas stream from the stripper in a condenser operating at a pressure lower than the stripper to concentrate the targeted gas;
separating condensed water from the concentrated targeted gas;
wherein the stripper during said stripping is at a pressure between 3 and 7 psia, and a temperature T=60~85° C., and wherein the low pressure exhaust steam is at a pressure between 3 to 7 psia and a temperature T=60~85° C.

4. A method for separating a targeted gas from a gas stream emitted from a power plant, the method comprising:
bringing the gas stream into contact with an absorption solution to preferentially absorb the targeted gas to be separated from the gas stream so that an absorbed gas is present within the absorption solution, providing a gas-rich solution;
introducing the gas-rich solution into a stripper;
injecting low pressure exhaust steam from a low pressure steam turbine of the power plant into the stripper with the gas-rich solution;
stripping the absorbed gas from the gas-rich solution in the stripper using the injected low pressure steam within the stripper to provide a gas stream containing the targeted gas, wherein the stripper is at or near vacuum;
condensing water vapor in a gas stream from the stripper in a condenser operating at a pressure lower than the stripper to concentrate the targeted gas;

separating condensed water from the concentrated targeted gas;

wherein the targeted gas is $O_2$, and the gas stream is an oxygen-containing gas mixture.

5. A method for separating a targeted gas from a gas stream emitted from a power plant, the method comprising:

bringing the gas stream into contact with an absorption solution to preferentially absorb the targeted gas to be separated from the gas stream so that an absorbed gas is present within the absorption solution, providing a gas-rich solution;

introducing the gas-rich solution into a stripper;

injecting low pressure exhaust steam from a low pressure steam turbine of the power plant into the stripper with the gas-rich solution;

stripping the absorbed gas from the gas-rich solution in the stripper using the injected low pressure steam within the stripper to provide a gas stream containing the targeted gas, wherein the stripper is at or near vacuum;

condensing water vapor in a gas stream from the stripper in a condenser operating at a pressure lower than the stripper to concentrate the targeted gas;

separating condensed water from the concentrated targeted gas;

wherein said bringing comprises bringing the gas stream into a membrane contactor or an integrated membrane system, wherein the absorption solution permeates through a membrane side, and a permeate side operates substantially under vacuum.

* * * * *

UNITED STATES PATENT AND TRADEMARK OFFICE
CERTIFICATE OF CORRECTION

PATENT NO. : 8,062,408 B2  
APPLICATION NO. : 11/801197  
DATED : November 22, 2011  
INVENTOR(S) : Shiaguo Chen et al.

Page 1 of 1

It is certified that error appears in the above-identified patent and that said Letters Patent is hereby corrected as shown below:

On the Patent Face:

In the "Other Publications" Section:

On page 3, left column, line 31    After "Energy,", please delete "Netl." and insert --NETL.-- therefor.

In the Specification:

| | |
|---|---|
| Col. 4, line 37 | After "cycle", please insert a --.--. |
| Col. 7, line 13 | Please delete "adsorb" and insert --absorb-- therefor. |
| Col. 8, line 31 | Please delete "adsorption" and insert --absorption-- therefor. |
| Col. 11, line 29 | Please delete "(AT)" and insert --(ΔT)-- therefor. |
| Col. 13, line 55 | Please delete "fro" and insert --for-- therefor. |

In the Claims:

Col. 16, line 30  
Claim 3    Before "stream", please delete "as" and insert --gas-- therefor.

Signed and Sealed this  
Tenth Day of April, 2012

David J. Kappos  
*Director of the United States Patent and Trademark Office*